(12) United States Patent
Johnson et al.

(10) Patent No.: US 8,551,279 B2
(45) Date of Patent: Oct. 8, 2013

(54) MULTILAYER ARTICLES AND METHODS OF MAKING AND USING THE SAME

(75) Inventors: Michael A. Johnson, Stillwater, MN (US); Frank A. Brandys, L'lle-Bizard (CA); Kent E. Nielsen, Dorchester (CA); Charlie C. Ho, Woodbury, MN (US); Vijay Rajamani, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 257 days.

(21) Appl. No.: 12/934,088

(22) PCT Filed: Mar. 18, 2009

(86) PCT No.: PCT/US2009/037470
§ 371 (c)(1),
(2), (4) Date: Sep. 23, 2010

(87) PCT Pub. No.: WO2009/120548
PCT Pub. Date: Oct. 1, 2009

(65) Prior Publication Data
US 2011/0045306 A1    Feb. 24, 2011

Related U.S. Application Data

(60) Provisional application No. 61/039,209, filed on Mar. 25, 2008.

(51) Int. Cl.
*B32B 37/00* (2006.01)
*B32B 37/10* (2006.01)
*B32B 37/14* (2006.01)
*B32B 37/26* (2006.01)

(52) U.S. Cl.
USPC ............... 156/295; 156/307.3; 156/324.4; 156/719

(58) Field of Classification Search
USPC ............ 428/423.1, 423.3; 156/307.3, 324.4, 156/719, 295; 528/88
See application file for complete search history.

(56) References Cited

U.S. PATENT DOCUMENTS

| | | |
|---|---|---|
| 3,436,359 A | 4/1969 | Hubin |
| 3,551,232 A | 12/1970 | Thompson |
| 3,728,182 A | 4/1973 | Wisotzky et al. |
| 4,457,797 A | 7/1984 | Hatchadoorian et al. |
| 4,522,670 A | 6/1985 | Caines |
| 4,569,885 A | 2/1986 | Yamaguchi et al. |

(Continued)

FOREIGN PATENT DOCUMENTS

| | | |
|---|---|---|
| CN | 1061980 A | 6/1992 |
| DE | 1 704 840 | 6/1971 |

(Continued)

OTHER PUBLICATIONS

International Search Report, PCT/US2009/037470, mailed Aug. 10, 2010, 4 pages.

(Continued)

*Primary Examiner* — Thao T. Tran
(74) *Attorney, Agent, or Firm* — Bradford B. Wright

(57) ABSTRACT

Multilayer articles comprising a thermoformable substrate, a base layer and an optional transparent protective layer. Methods of making and paint film composites, and shaped articles made thereby, are also disclosed.

3 Claims, 2 Drawing Sheets

(56) References Cited

U.S. PATENT DOCUMENTS

| | | | |
|---|---|---|---|
| 4,590,021 A | 5/1986 | Ota et al. |
| 4,642,126 A | 2/1987 | Zador |
| 4,652,274 A | 3/1987 | Boettcher |
| 4,769,100 A | 9/1988 | Short et al. |
| 4,810,540 A | 3/1989 | Ellison et al. |
| 4,824,506 A | 4/1989 | Hoerner et al. |
| 4,828,637 A | 5/1989 | Mentzer et al. |
| 4,833,213 A | 5/1989 | Leir et al. |
| 4,838,973 A | 6/1989 | Mentzer et al. |
| 4,902,557 A | 2/1990 | Rohrbacher |
| 4,913,760 A | 4/1990 | Benson et al. |
| 5,021,981 A | 6/1991 | Swartzel et al. |
| 5,034,275 A | 7/1991 | Pearson |
| 5,037,681 A | 8/1991 | Yada et al. |
| 5,114,789 A | 5/1992 | Reafler |
| 5,128,434 A | 7/1992 | Lai |
| 5,132,148 A | 7/1992 | Reafler |
| 5,192,609 A | 3/1993 | Carroll, Jr. |
| 5,201,981 A | 4/1993 | Whiteside |
| 5,215,811 A | 6/1993 | Reafler et al. |
| 5,252,694 A | 10/1993 | Willett et al. |
| 5,324,382 A | 6/1994 | Whiteside |
| 5,405,675 A | 4/1995 | Sawka et al. |
| 5,410,791 A | 5/1995 | Wirth et al. |
| 5,410,971 A | 5/1995 | Golden et al. |
| 5,417,726 A | 5/1995 | Stout et al. |
| 5,449,429 A | 9/1995 | Langenbrunner |
| 5,468,532 A | 11/1995 | Ho et al. |
| 5,591,527 A * | 1/1997 | Lu | 428/411.1 |
| 5,607,536 A | 3/1997 | Tikka |
| 5,648,136 A | 7/1997 | Bird |
| 5,707,697 A | 1/1998 | Spain et al. |
| 5,729,963 A | 3/1998 | Bird |
| 5,798,409 A | 8/1998 | Ho |
| 5,900,093 A | 5/1999 | Langenbrunner |
| 5,951,939 A | 9/1999 | Chernyak et al. |
| 5,960,527 A | 10/1999 | Ellison et al. |
| 5,968,657 A | 10/1999 | Scullin et al. |
| 5,972,279 A | 10/1999 | Harris et al. |
| 5,985,198 A | 11/1999 | Harris et al. |
| 6,012,818 A | 1/2000 | Araki |
| 6,083,335 A | 7/2000 | Scullin et al. |
| 6,143,227 A | 11/2000 | Heiden et al. |
| 6,164,739 A | 12/2000 | Schulz et al. |
| 6,221,304 B1 | 4/2001 | Harris et al. |
| 6,254,712 B1 | 7/2001 | Enlow et al. |
| 6,258,918 B1 | 7/2001 | Ho et al. |
| 6,284,183 B1 | 9/2001 | Roys et al. |
| 6,336,988 B1 | 1/2002 | Enlow et al. |
| 6,367,361 B1 | 4/2002 | Christensen et al. |
| 6,440,546 B1 | 8/2002 | Fields et al. |
| 6,468,643 B1 | 10/2002 | Kanbayashi et al. |
| 6,492,012 B1 | 12/2002 | Shah |
| 6,521,145 B1 | 2/2003 | Engler et al. |
| 6,547,912 B2 | 4/2003 | Enlow et al. |
| 6,607,831 B2 | 8/2003 | Ho et al. |
| 6,623,667 B2 | 9/2003 | Lundin |
| 6,635,314 B1 | 10/2003 | William et al. |
| 6,667,101 B2 | 12/2003 | Silagy et al. |
| 6,676,754 B1 | 1/2004 | Fleming et al. |
| 6,709,723 B2 | 3/2004 | Roys et al. |
| 6,709,748 B1 | 3/2004 | Ho et al. |
| 6,723,427 B1 | 4/2004 | Johnson et al. |
| 6,773,804 B2 | 8/2004 | Enlow et al. |
| 6,838,130 B1 | 1/2005 | Spain |
| 6,890,658 B2 | 5/2005 | Egashira |
| 6,890,685 B2 | 5/2005 | Yamamoto |
| 6,966,962 B2 | 11/2005 | Spain et al. |
| 6,984,280 B2 | 1/2006 | Spain et al. |
| 7,132,142 B2 | 11/2006 | Truog et al. |
| 7,144,612 B2 | 12/2006 | LaFave et al. |
| 7,195,727 B2 | 3/2007 | Sienkiewicz et al. |
| 2004/0076766 A1 | 4/2004 | Fey et al. |
| 2004/0209057 A1 | 10/2004 | Enlow et al. |
| 2004/0224101 A1 | 11/2004 | Johnson |
| 2004/0234771 A1 | 11/2004 | Meyer et al. |
| 2007/0034326 A1 | 2/2007 | Kikuchi et al. |
| 2007/0116903 A1 | 5/2007 | Song et al. |
| 2007/0122630 A1 | 5/2007 | Worthen |
| 2007/0128365 A1 | 6/2007 | Koch et al. |
| 2007/0141264 A1 | 6/2007 | Satgurunathan et al. |
| 2007/0256597 A1 | 11/2007 | Rukavina |
| 2008/0199704 A1 | 8/2008 | Ho et al. |
| 2008/0311349 A1* | 12/2008 | Johnson et al. | 428/172 |
| 2010/0032082 A1 | 2/2010 | Ho et al. |
| 2011/0027594 A1* | 2/2011 | Johnson et al. | 428/425.8 |

FOREIGN PATENT DOCUMENTS

| | | |
|---|---|---|
| EP | 0 392 847 A2 | 10/1990 |
| EP | 1 099 542 A1 | 5/2001 |
| EP | 1 125 730 A2 | 8/2001 |
| EP | 1 743 764 A2 | 1/2007 |
| FR | 2 790 424 A1 | 9/2000 |
| JP | S61-26612 | 2/1986 |
| JP | S61-26615 | 6/1986 |
| JP | S63-64739 | 3/1988 |
| JP | S63-183838 | 7/1988 |
| JP | H03-505308 | 11/1991 |
| JP | 05-155976 A | 6/1993 |
| JP | H09-29891 | 2/1997 |
| JP | 2001-129927 | 5/2001 |
| JP | 2001-187362 A | 7/2001 |
| JP | 2002-103517 | 4/2002 |
| JP | 2002-307625 | 10/2002 |
| JP | 2003-001648 A | 1/2003 |
| JP | 2003-165930 | 6/2003 |
| JP | 2003-165930 A | 6/2003 |
| JP | 2004-115681 | 4/2004 |
| JP | 2005-133013 A | 5/2005 |
| JP | 2005-179422 | 7/2005 |
| JP | 2006-88651 | 4/2006 |
| JP | 2007-136679 A | 6/2007 |
| JP | 2007-297569 A | 11/2007 |
| JP | 2008-023854 | 2/2008 |
| WO | WO 89/04257 A1 | 5/1989 |
| WO | WO 89/10260 | 11/1989 |
| WO | WO 93/21014 A1 | 10/1993 |
| WO | WO 94/29127 A1 | 12/1994 |
| WO | WO 96/40480 A1 | 12/1996 |
| WO | WO 97/20642 A1 | 6/1997 |
| WO | WO 97/22420 A1 | 6/1997 |
| WO | WO 97/22421 A1 | 6/1997 |
| WO | WO 97/46377 A1 | 12/1997 |
| WO | WO 97/48776 A1 | 12/1997 |
| WO | WO 99/08870 A1 | 2/1999 |
| WO | WO 00/18516 A2 | 4/2000 |
| WO | WO 00/32680 A1 | 6/2000 |
| WO | WO 00/33975 A2 | 6/2000 |
| WO | WO 01/26874 A1 | 4/2001 |
| WO | WO 02/00448 A2 | 1/2002 |
| WO | WO 03/018284 A1 | 3/2003 |
| WO | WO 03/060020 A1 | 7/2003 |
| WO | WO 03/095237 A1 | 11/2003 |
| WO | WO 2004/003049 A1 | 1/2004 |
| WO | WO 2004/073967 A2 | 9/2004 |
| WO | WO 2004/074386 A2 | 9/2004 |
| WO | WO 2004/089589 A1 | 10/2004 |
| WO | WO 2005/011958 A1 | 2/2005 |
| WO | WO 2005/047058 A2 | 5/2005 |
| WO | WO 2006/069015 A2 | 6/2006 |
| WO | WO 2006/102581 A1 | 9/2006 |
| WO | WO 2007/059282 A1 | 5/2007 |
| WO | WO 2007/067523 A1 | 6/2007 |
| WO | WO 2008/039658 A2 | 4/2008 |
| WO | WO 2008/039659 A2 | 4/2008 |
| WO | WO 2008/042883 A2 | 4/2008 |
| WO | WO 2009/011989 A1 | 1/2009 |
| WO | WO 2009/012079 A2 | 1/2009 |

OTHER PUBLICATIONS

Written Opinion of the International Searching Authority, PCT/US2009/037470, mailed Aug. 10, 2010, 8 pages.

A. M. Kaminski and M. W. Urban, "Interfacial Studies of Crosslinked Polyurethanes; Part 1. Quantitative and Structural Aspects of Crosslinking and Near Film-Air and Film-Substrate Interfaces in Solvent-Borne Polyurethanes", Journal of Coatings Technology, vol. 69, No. 872, Sep. 1997, pp. 55-66.

C. H. Fridley, "Focus: Automotive Painting/Powder Coating: Another Way to Paint Plastics", Products Finishing, Apr. 1992, pp. 72-77.

T. S. Wilson et al., "Shape Memory Polymers Based on Uniform Aliphatic Urethane Networks", Journal of Applied Polymer Science, Jun. 2007, vol. 103, pp. 540-551.

A. Lendlein and S. Kelch, "Shape-Memory Polymers", Angewandte Chemie Int. Ed., 2002, vol. 41, pp. 2034-2057.

Catalogue of fine Chemical Products, vol. 2, Dec. 31, 2003 p. 811.

* cited by examiner

MULTILAYER ARTICLES AND METHODS OF MAKING AND USING THE SAME

CROSS-REFERENCE TO RELATED APPLICATIONS

This application is a national stage filing under 35 U.S.C. 371 of PCT/US2009/037470, filed Mar. 18, 2009, which claims priority to U.S. Provisional Application No. 61/039209, filed Mar. 25, 2008, and the disclosure of which is incorporated by reference in its entirety herein.

BACKGROUND

It is common practice to decorate the surface of manufactured articles to create an aesthetically pleasing look for the product. This has traditionally been accomplished through the use of liquid paints and clear coats, typically containing solvents that evaporate from the paint leaving behind the solids in the form of a uniform film that decorates the surface of the article.

Traditional vehicle assembly methods typically include a spray painting step to paint and/or coat visible vehicle parts and provide a protective and aesthetic appealing outer surface. However, the process of spray painting is time-consuming and generally involves volatile organic solvents that present special handling and/or environmental issues.

The transportation industry has sought to reduce solvents in vehicle assembly plants through the development and use of decorative films, known in the art as "paint films" and "paint protection films". The original idea behind paint film was to utilize a conventional paint, which would simply be coated onto a liner and dried. The liner would then be releasably removed from the paint film which would then be applied to, for example, a three-dimensionally shaped vehicle body part. In order to improve the appearance of paints, a transparent clear coat (commonly known as a clear coat) is known to be applied onto the colored paint (commonly known as a base coat). Similarly, paint films may have a transparent clear layer disposed on a color layer. Paint protection films have a transparent clear layer, typically in combination with an adhesive layer.

However, achieving a high quality application (for example, free of wrinkles and/or puckers) remains a serious concern with paint films and paint protection films, especially if applied to large or severely contoured surfaces.

There are two predominant techniques used to manufacture paint films and paint protection films: (1) solution-casting; and (2) extrusion. Each of these processes typically requires the use of elevated temperature (120° C. to 250° C. or more) to either evaporate the solvent (solution casting) or to melt the polymer (extrusion). Such temperatures are prone to thermally inducing shifts in color and other appearance properties of paint films, making color and appearance matching difficult to achieve.

High gloss and high image clarity are among the most common requirements for automotive finishes. While solvent based paints and clear coats are typically capable of acceptable appearance, extruded plastic films fall well short of achieving a desirable rich 'wet-look'.

If paint films or paint protection films are applied to three-dimensional shaped vehicle parts problems may be encountered such as, for example, stretching, wrinkling, and/or puckering of the film during application that renders the finished body parts aesthetically, and possibly functionally, unsuitable. These problems may be made even worse by molecular orientation of the film (for example, during extrusion) such that stretchability of the film varies with film orientation.

SUMMARY

In one aspect, the present disclosure provides a multilayer article comprising:
a thermoformable substrate having a first major surface and a second major surface opposite the first major surface;
a base layer having a first major surface contacting and permanently adhered to the second major surface of the thermoformable substrate, the base layer comprising a polymeric material and being substantially isotropic, the first major surface of the base layer being permanently adhered and covalently bonded to the second major surface of the thermoformable substrate.

In another aspect, the present disclosure provides a multilayer article comprising:
a thermoformable substrate having a first major surface and a second major surface opposite its first major surface;
a base layer having a first major surface contacting and permanently adhered to the second major surface of the thermoformable substrate, the base layer comprising a polymeric material, the base layer having a second major surface opposite its first major surface, each of the first and second major surfaces of the base layer being a substantial inverse image of a major surface of first and second respective corresponding forming webs, and the first major surface of the base layer being permanently adhered and covalently bonded to the second major surface of the thermoformable substrate.

In certain embodiments, at least one of the thermoformable substrate and the base layer comprises a colorant, and wherein a combination of the base layer and the thermoformable substrate is opaque or translucent. In certain embodiments, the polymeric material is selected from the group consisting of silicones, epoxies, acrylics, polyurethanes, and combinations thereof. In certain embodiments, the polymeric material comprises a polyurethane. In certain embodiments, the polyurethane has hard segments in an amount of from 35 to 65 percent by weight. In certain embodiments, the multilayer article further comprises a liner releasably adhered to and contacting the second major surface of the base layer.

In certain embodiments, the multilayer article further comprises a transparent protective layer, the transparent protective layer having a first major surface and a second major surface opposite its first major surface. In certain embodiments, the multilayer article further comprises a liner releasably adhered to and contacting the second major surface of the transparent protective layer.

In another aspect, the present disclosure provides a multilayer article comprising:
a thermoformable substrate having a first major surface and a second major surface opposite its first major surface;
a base layer having a first major surface and a second major surface opposite its first major surface, the first major surface of the base layer contacting and permanently adhered to the second major surface of the thermoformable substrate, and the base layer comprising a first polymeric material;
a transparent protective layer having a first major surface and a second major surface opposite its first major surface, the first major surface of the transparent protective layer contacting and permanently adhered to the second major surface of the base layer, and wherein the transparent protective layer comprises a second polymeric material; and
at least one of the base layer and the transparent protective layer being substantially isotropic, at least one of the thermoformable substrate and the base layer comprising a colorant, and a combination of the base layer and the thermoformable substrate being opaque or translucent.

In another aspect, the present disclosure provides a multilayer article comprising:

a thermoformable substrate having first major surface and a second major surface opposite its first major surface;

a base layer having a first major surface and a second major surface opposite its first major surface, the first major surface of the base layer contacting and permanently adhered to the second major surface, and the base layer comprising a first polymeric material;

a transparent protective layer having a first major surface and a second major surface opposite its first major surface, the first major surface of the transparent protective layer contacting and permanently adhered to the second major surface of the base layer, and the transparent protective layer comprising a second polymeric material; and at least one of the thermoformable substrate and the base layer comprising a colorant, a combination of the base layer and the thermoformable substrate being opaque or translucent, and:

i) each of the first and second major surfaces of the base layer being a substantial inverse image of a major surface of first and second respective corresponding forming webs;

ii) each of the first and second major surfaces of the transparent protective layer being a substantial inverse image of a major surface of third and fourth respective corresponding forming webs; or iii) both i) and ii).

In another aspect, the present disclosure provides a multilayer article comprising:

a thermoformable substrate having first major surface and a second major surface opposite its first major surface;

an adhesive layer;

a base layer having a first major surface and a second major surface opposite its first major surface, the first major surface of the base layer being permanently adhered to the second major surface of the thermoformable substrate by the adhesive layer, the base layer comprising a first polymeric material;

a transparent protective layer having a first major surface and a second major surface opposite its first major surface, the first major surface of the transparent protective layer contacting and permanently adhered to the second major surface of the base layer, and the transparent protective layer comprising a second polymeric material and being substantially isotropic; and at least one of the thermoformable substrate and the base layer comprising a colorant, and a combination of the base layer and the thermoformable substrate being opaque or translucent.

In another aspect, the present disclosure provides a multilayer article comprising:

a thermoformable substrate having first major surface and a second major surface opposite its first major surface;

an adhesive layer;

a base layer having a first major surface and a second major surface opposite its first major surface, the first major surface of the base layer being permanently adhered to the second major surface by the adhesive layer, the base layer comprising a first polymeric material;

a transparent protective layer having a first major surface and a second major surface opposite its first major surface, the first major surface of the transparent protective layer contacting and permanently adhered to the second major surface of the base layer, the transparent protective layer comprising a second polymeric material; and at least one of the thermoformable substrate and the base layer comprising a colorant, a combination of the base layer and the thermoformable substrate being opaque or translucent, and:

i) each of the first and second major surfaces of the base layer being a substantial inverse image of a major surface of first and second respective corresponding forming webs;

ii) each of the first and second major surfaces of the transparent protective layer being a substantial inverse image of a major surface of third and fourth respective corresponding forming webs; or iii) both i) and ii).

In certain embodiments, the second major surface of the base layer exhibits surface shape recovery. In certain embodiments, the second major surface of the transparent protective layer exhibits surface shape recovery. In certain embodiments, the second polymeric material is selected from the group consisting of silicones, polyethers, acrylics, polyurethanes, and combinations thereof. In certain embodiments, the second polymeric material comprising a polyurethane. In certain embodiments, the polyurethane has hard segments in an amount of from 35 to 65 percent by weight. In certain embodiments, the multilayer article further comprises an adhesive backsize disposed on the first major surface of the thermoformable substrate. In certain embodiments, the multilayer article further comprises a liner releasably adhered to and contacting the second major surface of the base layer. In certain embodiments, the multilayer article further comprises a liner releasably adhered to and contacting the second major surface of the transparent protective layer.

Advantageously, multilayer articles according to the present disclosure generally have one or more useful physical and aesthetic properties such as, but not limited to, little or no volatile organic solvent content (for example, resulting in multi that are substantially or essentially solvent-free) and/or with essentially no solvent gradient with respect to film thickness, substantially identical mechanical properties with respect to length and width, very low visual defect rate, high gloss and good distinctness of image (for example, wet look), and the ability to form the multilayer articles into shaped parts without compromising the paint film appearance.

In another aspect, the present disclosure provides a method of using a multilayer article, the method comprising thermoforming a multilayer article according to the present disclosure.

In another aspect, the present disclosure provides a method of using a multilayer article, the method comprising injection cladding a multilayer article according to the present disclosure.

In another aspect, the present disclosure provides a method of forming a shaped article, the method comprising forming a multilayer article according to the present disclosure into a predetermined shape. In certain embodiments, the predetermined shape corresponds to a vehicle body part, vehicle trim, or at least a portion of an appliance housing. In certain embodiments, the predetermined shape corresponds to a vehicle body part or vehicle trim. In another aspect, the present disclosure provides a shaped article formed by a method of forming a shaped article according to the present disclosure.

In another aspect, the present disclosure provides a method of making a multilayer article, the method comprising:

providing a thermoformable substrate having a first major surface and a second major surface opposite its first major surface, the second major surface of the thermoformable substrate comprising reactive groups;

contacting a curable composition with the second major surface and a forming web to form a rolling bank of the curable composition disposed between the thermoformable substrate and the forming web, the curable composition comprising a curable polymeric material precursor, and the curable composition being covalently reactive with the reactive groups;

passing at least a portion of each of the thermoformable substrate, the forming web, and the curable composition through a nip to provide a curable layer precursor while said at least a portion of the curable composition is sandwiched between the thermoformable substrate and the forming web; and at least partially curing the curable layer precursor to provide a base layer, the base layer comprising a polymeric material, and at least one of the thermoformable substrate and the base layer comprising a colorant, and a combination of the base layer and the thermoformable substrate being opaque or translucent.

In another aspect, the present disclosure provides a method of making a multilayer article, the method comprising:

providing a thermoformable substrate having a first major surface and a second major surface opposite its first major surface, a base layer being adhered to the second major surface of the thermoformable substrate, the base layer comprising a first polymeric material.

contacting a curable composition with the base layer and a forming web to form a rolling bank of the curable composition disposed between the base layer and the forming web, the curable composition comprising a curable polymeric material precursor;

passing at least a portion of each of the thermoformable substrate, the base layer, the forming web, and the curable composition through a nip to provide a curable layer precursor while said at least a portion of the curable composition is sandwiched between the base layer and the forming web; and at least partially curing the curable layer precursor to provide a transparent protective layer comprising a second polymeric material.

In certain embodiments, the method further comprises disposing an adhesive layer of the thermoformable substrate on the first major surface of the base layer. In certain embodiments, at least one of the thermoformable substrate and the base layer comprising a colorant, and a combination of the base layer and the thermoformable substrate being opaque or translucent.

In another aspect, the present disclosure provides a method of making a multilayer article, the method comprising:

providing a first forming web and a base layer releasably adhered to the first forming web, the base layer comprising a first polymeric material, and the base layer having a first major surface and a second major surface opposite its first major surface;

contacting a curable composition with the base layer and a second forming web to form a rolling bank of the curable composition disposed between the base layer and the second forming web, the curable composition comprising a curable polymeric material precursor;

passing at least a portion of each of the first forming web, the base layer, the second forming web, and the curable composition through a nip to provide a curable layer precursor while said at least a portion of the curable composition is sandwiched between the base layer and the second forming web;

at least partially curing the curable layer precursor to provide a transparent protective layer comprising a second polymeric material;

separating the first forming web from the base layer;

disposing a first adhesive layer on the first major surface of base layer;

providing a thermoformable substrate having a first major surface and a second major surface opposite its first major surface; and permanently adhering the first adhesive layer to the second major surface of the thermoformable substrate.

In certain embodiments, at least one of the thermoformable substrate and the base layer comprises a colorant, and a combination of the base layer and the thermoformable substrate being opaque or translucent. In certain embodiments, the method further comprises disposing a second adhesive layer on the first major surface of the thermoformable substrate. In certain embodiments, at least one of the first polymeric material and the second polymeric material being selected from the group consisting of silicones, polyethers, acrylics, polyurethanes, and combinations thereof. In certain embodiments, at least one of the first polymeric material and the second polymeric material comprises a polyurethane. In certain embodiments, the polyurethane has hard segments in an amount of from 35 to 65 percent by weight.

In another aspect, the present disclosure provides a multilayer article made according to a method of making a multilayer article according to the present disclosure.

Advantageously, methods of multilayer articles according to the present disclosure have low coating defect rates, may be practiced using little or no volatile organic solvent, are suitable for preparing films of thicknesses not achievable in a single coating pass out of solvent, and are not prone to creating films with anisotropic mechanical properties. And, methods of making multilayer articles according to the present disclosure are useful for making special effects (for example, metal flake, pearlescent) pigment-containing multilayer articles.

The following definitions apply throughout the specification and claims.

"Adherend" refers to an object being adhered.

"Substantially isotropic" means having at least one mechanical property that does not vary, or only slightly varies, along the length direction and width direction, and also means not having an organic solvent gradient across the thickness direction. Thus, an extruded polymeric layer is not considered substantially isotropic, when the polymeric layer has at least one mechanical property that is different when measured along its length compared to the same mechanical property measured along its width. In addition, a solvent-cast polymeric layer is not considered substantially isotropic, when the polymeric layer has an organic solvent concentration gradient across its thickness. Such a concentration gradient generally indicates that the polymeric layer was solvent cast.

"Essentially isotropic" means having the same mechanical properties with respect to length and width, and not having an organic solvent gradient with respect to thickness.

"Substantially solvent-free" means containing less than or equal to 0.5 percent by weight of volatile organic solvent.

"Essentially solvent-free" means containing less than or equal to 0.3 percent by weight of volatile organic solvent.

"Forming web" refers to a film, layer, belt or other web-shaped substrate having a major surface on which a corresponding major surface of the base layer or the protective transparent layer is removably or permanently formed.

"Layer" refers to a unitary layer unless otherwise specified.

"One-part urethane" and "two-part urethane" refer to curable resins that react to form a polyurethane.

"Permanently adhered" in reference to two adherends means not mechanically separable without causing significant physical damage to (for example, tears or rips in) the adhesive layer or either of the two adherends.

"Polyurethane" refers to polymers having repeated subunits in the backbone that have —OC(=O)NH— and/or —HNC(=O)NH— groups.

"Thermoformable" means capable of being thermoformed.

"Thermoforming" refers to a process for in which a sheet or film of material, typically comprising an organic polymeric material, is heated to a forming temperature, and then stretched over or into a temperature controlled single-surface mold. The sheet is held against the mold surface until cooled. The formed part is then trimmed from the sheet or film.

"Volatile organic solvent" refers to any organic solvent having an initial boiling point less than or equal to 250° C. at a pressure of 1 atmosphere (101.3 kPa).

Other objects and advantages of the invention will become more apparent from the following drawings wherein like numerals refer to like parts, the accompanying description and the appended claims.

Figure 1:
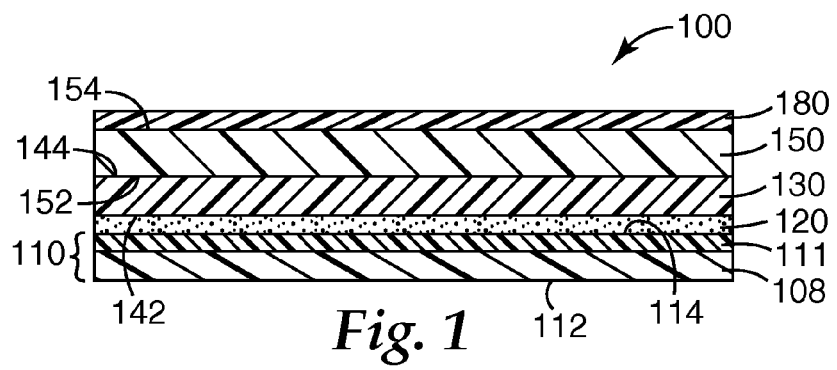
FIG. 1 is a side-view of an exemplary multilayer article according to the present disclosure.

While the invention is amenable to various modifications and alternative forms, specifics thereof that have been shown by way of example in the drawings will be described in detail. It should be understood, however, that the intention is not to limit the invention to the particular embodiments described. To the contrary, the intention is to cover all modifications, equivalents, and alternatives falling within the spirit and scope of the present disclosure.

DETAILED DESCRIPTION

To promote an understanding of the principles of the present invention, descriptions of specific embodiments of the present invention follow and specific language is used to describe the specific embodiments. It will nevertheless be understood that no limitation of the scope of the present invention is intended by the use of specific language. Alterations, further modifications, and such further applications of the principles of the present invention discussed are contemplated as would normally occur to one ordinarily skilled in the art to which the invention pertains.

An exemplary embodiment of a multilayer article is broadly shown in FIG. 1. Referring now to FIG. 1, multilayer article 100 comprises thermoformable substrate 110, optional adhesive layer 120, and base layer 130. Thermoformable substrate 110 has first major surface 112 and second major surface 114 opposite first major surface 112. Base layer 130 has first major surface 142 and second major surface 144 opposite first major surface 142. First major surface 142 of base layer 130 is permanently bonded to second major surface 114 of thermoformable substrate 110. In some embodiments, thermoformable substrate 110 includes optional tie layer 111 (comprising second major surface 114) and bulk portion 108. Base layer 130 is permanently adhered to and covalently bonded (that is, bonded through a continuous sequence of covalent chemical bonds) to thermoformable substrate 110.

If present, optional transparent protective layer 150 has first major surface 152 and second major surface 154 opposite first major surface 152. First major surface 152 of the optional transparent protective layer 150 contacts and is permanently adhered to second major surface 144 of base layer 130.

If present, optional protective liner 180 is releasably adhered to second major surface 144 of base layer 130 or, if optional transparent protective layer 150 is present, second major surface 154 of transparent protective layer 150.

Thermoformable Substrate 110

The thermoformable substrate may be, for example, in the form of a film (for example, a continuous film) and/or sheet. The thermoformable substrate may be limp and flexible, stiff and self-supporting, or any stiffness in between. The thermoformable substrate may have any thickness; typically, between about 0.01 millimeters and 10 millimeters, more typically between about 0.1 millimeters and 5 millimeters, although this is not a requirement.

The thermoformable substrate may be flat or flattenable, or it may be formed into a shape corresponding to an automotive body part or some other three-dimensional shape. Typically the thermoformable substrate will be of sufficient size that it can be readily used in conjunction with industrial thermoforming equipment, although this is not a requirement. The thermoformable substrate, or at least the bulk portion thereof, may comprise one or more thermoplastic materials and/or lightly covalently crosslinked polymeric materials exhibiting sufficient deformability at temperature(s) useful in thermoforming process(es). Examples of such materials include: fluoropolymers such as, for example, fluorinated ethylene-propylene copolymers, polyvinylidene fluoride, and polychlorotrifluoroethylene; thermoplastic silicones; polyethers; acrylics (for example, poly(butyl acrylate), poly(isobutyl methacrylate), poly(methyl acrylate), poly(methyl methacrylate), poly(propyl methacrylate), and polyacrylonitrile); polyesters such as for example, poly(ethylene terephthalate), polyethylene terephthalate glycol, and polycaprolactone; poly(vinyl ethers) such as, for example, poly(vinyl acetate); cellulosics such as, for example, ethyl cellulose, cellulose acetate, cellulose propionate, cellulose acetate butyrate, and cellulose nitrate; polyolefins such as, for example, poly(4-methylpent-1-ene), polybutylene, polyisobutylene, polystyrenes (including high impact polystyrenes), polyethylene (including low density and high density polyethylenes), and polypropylene; acrylonitrile butadiene styrene copolymers; polyetheramides; polyether ether ketones; polyetherimides; polycarbonates; ionomeric resins such as for example, ionomeric resins marketed by E.I. du Pont de Nemours, Wilmington, Del., under the trade designation SURLYN; natural rubber; polyamides such as, for example, nylon-6 and nylon-6,6; polyimides; thermoplastic polyurethanes; copolymers of styrene and acrylonitrile; copolymers of styrene and butadiene; polycarbonates; and blends and mixtures thereof.

These materials may be used in combination with additives such as, for example, plasticizers, flow additives, fillers, antioxidants, light stabilizers, colorants (for example, dye, metal flake, or pigment), and flame retardants.

The thermoformable substrate may have multiple layers or components (for example, on the side opposite the base layer) or it may be a unitary thermoformable substrate.

The thermoformable substrate may have a surface treatment comprising at least a portion of the second major surface to enhance adhesion to the base layer. Examples of surface treatments include flame treatment, corona treatment, and reactive grafting of monomers (for example, by electron beam radiation in the presence of a free-radically polymerizable monomer having at least one functional group (for example, hydroxyl, epoxy, trialkoxysilyl, or carboxyl) that is reactive with the base layer or to monomers and/or oligomers used to make the base layer). Examples of monomers useful for such reactive grafting include acrylic acid, methacrylic acid, 2-hydroxyethyl acrylate, 2-triethoxysilylethyl methacrylate, glycidyl methacrylate, and glycidyl acrylate. Such treatments are typically useful for enhancing adhesion to low energy materials such as polyolefins (for example, polypropylene, polyethylene), silicones, and fluoropolymers.

Optional Tie Layer

Optionally, at least a portion of the second major surface of the thermoformable substrate may comprise a tie layer, which may optionally be covalently bonded to the bulk portion of the thermoformable substrate 110 to optional adhesive layer 120 or base layer 130. Examples of materials useful in tie layers include polyamides, ethylene vinyl acetate copolymers, chlorinated polyolefins, maleic anhydride grafted polymers, and combinations thereof.

Optional Adhesive Layer 120

The optional adhesive layer may comprise any adhesive that is capable of permanently adhering the base layer to the thermoformable substrate. For example, the adhesive layer may comprise a pressure-sensitive adhesive, a hot melt adhesive, or a combination thereof. Examples of pressure-sensitive adhesives include tackified or untackified materials such as tackified natural rubbers, tackified synthetic rubbers, tackified styrene block copolymers, self-tacky or tackified acrylate or methacrylate copolymers, self-tacky or tackified poly(alpha-olefins), and self-tacky or tackified silicones. Examples of hot melt adhesives include hot melt adhesives based on polyester, ethylene vinyl acetate (EVA), polyamides, polyurethanes, and polyethers. The optional adhesive layer may have any thickness, but will typically have a thickness in a range of from 1 to 100 micrometers.

The optional adhesive layer may be supplied by any suitable technique. For example, the optional adhesive layer can be applied to the thermoformable substrate prior to applying the base layer, or it may be applied to the base layer and then bonded to the thermoformable substrate. Suitable application methods for the optional adhesive layer include, for example, spraying, solvent coating, and lamination.

Base Layer 130

Base layer 130 comprises a material that, as implemented, is thermoformable.

Examples of polymeric materials suitable for use in base layer 130 include melt-processable polymeric materials such as thermoplastic or lightly cross-linked polymeric materials, and in some cases even thermoset polymeric materials. As used herein, the term "thermoset" means chemically crosslinked to the point where melt flow cannot occur.

Examples of suitable polymeric materials include silicones (for example, as made by moisture curing silicone resin, optionally in the presence of an appropriate catalyst), polyethers (for example, from polymerization of a one-part or two-part epoxy resin, optionally in the presence of an appropriate catalyst), acrylics (for example, as made by thermal or photo-polymerization of acrylic monomer(s)), polyurethanes (for example, as made by condensation polymerization of one-part or two-part urethane resins, optionally in the presence of an appropriate catalyst), and combinations thereof.

Typically, the polymeric materials are prepared from components (for example, monomers, oligomers, hardeners, initiators) that do not off-gas at or near ambient conditions. Accordingly, it is typically desirable to place the components comprising base layer 130 under vacuum to remove volatile components prior to forming base layer 130. In general, to achieve useful film properties the functionality of addition polymerizable monomers and oligomers (for example, epoxies, acrylates) should be at least one (1), more typically at least 1.1, 1.2, 1.3, 1.4, 1.5, or even at least 1.8 or 2.0, or more. In general, to achieve useful film properties the functionality of condensation polymerizable monomers and oligomers (for example, alkoxysilanes, two-part urethanes) should be at least two (2) for each reactive component (for example, a polyisocyanate/polyol pair), more typically at least 2.1, 2.2, 2.3, 2.4, 2.5, or even at least 2.8 or 3.0, or more. In general, lower functionality is associated with relatively increased extensibility (for example, elongation at break) and relatively lower hardness, while the converse is generally true with higher functionality.

Combinations of the foregoing curable monomers and oligomers may also be used (for example, silicone/acrylate or urethane/acrylate). The specific choice of materials will typically depend on the desired physical properties (for example, strength, appearance, weatherability, formability, abrasion resistance) of color layer 130.

Silicones and curable systems for their preparation are well-known. Silicones may be obtained, for example, by curing of moisture-cure silicones (for example, RTV silicones), two-part silicones (for example, a Part A of hydroxy-terminated polydimethylpolysiloxane and a Part B of trialkoxysilyl-terminated polydimethylsiloxane), or photo- or thermal curing of vinyl substituted polydimethylsiloxanes and hydride-terminated polydimethylsiloxanes using a hydrosilation catalyst. In addition, silicones may be prepared from monomeric silanes such as, for example, dimethoxydimethylsilane, dimethoxydiethylsilane, diethoxydimethylsilane, diethoxydiethylsilane, and other dialkoxydialkylsilanes; trimethoxymethylsilane, trimethoxyethylsilane, trimethoxypropylsilane, triethoxymethylsilane, triethoxyethylsilane, and other trialkoxyalkylsilanes; tetramethoxysilane, tetraethoxysilane, tetrapropoxysilane, and other tetraalkoxysilanes; methyltri(methoxyethoxy)silane, and other alkoxyalkoxysilanes; methyltriisopropenoxy-silane, and other alkenoxysilanes; methyltriacetoxysilane, and other acyloxysilanes. Optionally, an acid catalyst may be included such as, for example, acetic acid, propionic acid, and fatty acids.

Polyethers and curable systems for their preparation are well-known. Examples of polyethers include polymers containing ethylenoxy, propylenoxy, and/or butylenoxy monomeric units. Polyethers may be uncrosslinked, but more typically are cross-linked (thermoset) produced by curing of epoxy monomer(s) and resin(s).

Examples of useful epoxy monomers include trimethylolpropane triglycidyl ether, 1,4-butanediol diglycidyl ether, ethylene glycol diglycidyl ether, cyclohexanedimethanol diglycidyl ether, polypropylene glycol diglycidyl ether, polyglycol diglycidyl ether, 1,6-hexanediol diglycidyl ether, trimethylolethane triglycidyl ether, castor oil triglycidyl ether, propoxylated glycerin triglycidyl ether, glycerol polyglycidyl ether; diglycerol polyglycidyl ether; glycerol propoxylate triglycidyl ether; trimethylolpropane triglycidyl ether; sorbitol polyglycidyl ether; poly(ethylene glycol) diglycidyl ether; poly(propylene glycol) diglycidyl ether; neopentyl glycol diglycidyl ether; N,N-diglycidyl-4-glycidyloxyaniline; N,N-diglycidyltoluidine; diglycidyl 1,2-cyclohexanedicarboxylate; diglycidyl bisphenol A; a polymer of diglycidyl bisphenol A; poly(bisphenol A-co-epichlorohydrin), glycidyl end capped; diglycidyl ether of a hydrogenated bisphenol A propylene oxide adduct; diglycidyl ester of terephthalic acid; diglycidyl 1,2,3,6-tetrahydrophthalate; spiroglycol diglycidyl ether; hydroquinone diglycidyl ether and derivatives thereof, propylene oxide, epichlorohydrin, styrene oxide, vinylcyclohexene oxide, vinylcyclohexene dioxide, glycidol, butadiene oxide, diglycidyl ether of bisphenol A, cyclohexene oxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolac resin, resorcinol diglycidyl ether, and epoxy silicones, for example, dimethylsiloxanes having cycloaliphatic epoxide or glycidyl ether groups, and mixtures thereof. Epoxy resins and monomers can be polymerized, for example, using a photocatalyst or a Lewis acid (for example, $BF_3$).

Two part-epoxy resins (for example, having a Part A of an amine or thiol hardener and a Part B having an epoxy group functional resin) are widely available and may also be used.

Acrylic polymers may be prepared by free-radical polymerization of free-radically polymerizable monomers such as, for example, (meth)acrylates (that is, acrylates and/or methacrylates) and vinyl ester functionalized materials. Of particular use are (meth)acrylates. They can be monomers and/or oligomers such as (meth)acrylates (meth)acrylamides, vinyl pyrrolidinone and azlactones. Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, stearyl acrylate, allyl acrylate, glycerol diacrylate, glycerol triacrylate, ethylene glycol diacrylate, diethyleneglycol diacrylate, triethyleneglycol dimethacrylate, 1,3-propanediol diacrylate, 1,3-propanediol dimethacrylate, trimethanol triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyl dimethylmethane, bis[1-(3-acryloxy-2-hydroxy)]-p-propoxyphenyl-dimethylmethane, tris-hydroxyethyl isocyanurate trimethacrylate; the bis-methacrylates of polyethylene glycols of molecular weight 200-500 g/mole, copolymerizable mixtures of acrylated monomers such as those described in U.S. Pat. No. 4,652,274 (Boettcher et al.), and acrylated oligomers such as those described in U.S. Pat. No. 4,642,126 (Zador et al.), the disclosures of which are incorporated herein by reference). Typically, a thermal initiator (for example, a peroxide or an azo initiator such as azobis (isobutyronitrile)) or a photoinitiator (for example, as available from Ciba Specialty Chemicals, Tarrytown, N.Y., under the trade designations DAROCUR and IRGACURE).

Methods and catalysts for curing the foregoing monomers may be found in U.S. Pat. No. 5,252,694 (Willett et al.), the disclosure of which is incorporated herein by reference.

In certain embodiments, the polymeric material comprises a polyurethane.

Polyurethanes may be prepared, for example, by the reaction of one or more polyols and/or polyamines and/or aminoalcohols with one or more polyisocyanates, optionally in the presence of non-reactive component(s). For applications where weathering is likely, it is typically desirable for the polyols, polyamines, and/or aminoalcohols and the polyisocyanates to be free of aromatic groups.

Suitable polyols include, for example, materials commercially available under the trade designation DESMOPHEN from Bayer Corporation, Pittsburgh, Pa. The polyols can be polyester polyols (for example, Desmophen 631A, 650A, 651A, 670A, 680, 110, and 1150); polyether polyols (for example, Desmophen 550U, 1600U, 1900U, and 1950U); or acrylic polyols (for example, Demophen A160SN, A575, and A450BA/A).

Suitable polyamines include, for example: aliphatic polyamines such as, for example, ethylene diamine, 1,2-diaminopropane, 2,5-diamino-2,5-dimethylhexane, 1,11-diaminoundecane, 1,12-diaminododecane, 2,4- and/or 2,6-hexahydrotoluoylenediamine, and 2,4'-diaminodicyclohexylmethane; and aromatic polyamines such as, for example, 2,4- and/or 2,6-diaminotoluene and 2,4'- and/or 4,4'-diaminodiphenylmethane; amine-terminated polymers such as, for example, those available from Huntsman Chemical (Salt Lake City, Utah), under the trade designation JEFFAMINE polypropylene glycol diamines (for example, Jeffamine XTJ-510) and those available from Noveon Corp., Cleveland, Ohio, under the trade designation Hycar ATBN (amine-terminated acrylonitrile butadiene copolymers), and those disclosed in U.S. Pat. No. 3,436,359 (Hubin et al.) and U.S. Pat. No. 4,833,213 (Leir et al.) (amine-terminated polyethers, and polytetrahydrofuran diamines); and combinations thereof.

Suitable aminoalcohols include, for example, 2-aminoethanol, 3-aminopropan-1-ol, alkyl-substituted versions of the foregoing, and combinations thereof.

Suitable polyisocyanate compounds include, for example: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl) diphenylmethane; 4,4'-diisocyanato-3,3'-dimethoxybiphenyl (o-dianisidine diisocyanate); 5-chloro-2, 4-toluene diisocyanate; and 1-chloromethyl-2,4-diisocyanato benzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, Desmodur XP7100 and Desmodur N 3300A) from Bayer Corporation (Pittsburgh, Pa.); and combinations thereof.

In some embodiments, the polyurethane comprises a reaction product of components comprising at least one polyisocyanate and at least one polyol. In some embodiments, the polyurethane comprises a reaction product of components comprising at least one polyisocyanate and at least one polyol. In some embodiments, the at least one polyisocyanate comprises an aliphatic polyisocyanate. In some embodiments, the at least one polyol comprises an aliphatic polyol. In some embodiments, the at least one polyol comprises a polyester polyol or a polycarbonate polyol.

Typically, the polyurethane(s) is/are extensible and/or pliable. For example, the polyurethane(s), or any layer containing polyurethane, may have a percent elongation at break (at ambient conditions) of at least 10, 20, 40, 60, 80, 100, 125, 150, 175, 200, 225, 250, 275, 300, 350, or even at least 400 percent, or more. In certain embodiments, the polyurethane has hard segments, typically segments corresponding to one or more polyisocyanates, in any combination, in an amount of from 35, 40, or 45 percent by weight up to, 50, 55, 60, or even 65 percent by weight.

As used herein: wt % means percent by weight based on the total weight of material, and Hard Segment wt %=(weight of short chain diol and polyol+weight of short chain di- or polyisocyanate)/total weight of resin wherein:
short chain diols and polyols have an equivalent weight≤185 g/eq, and a functionality≥2; and
short chain isocyanates have an equivalent weight≤320 g/eq and a functionality≥2.

One or more catalysts are typically included with two-part urethanes. Catalysts for two-part urethanes are well known and include, for example, aluminum-, bismuth-, tin-, vanadium-, zinc-, tin-, and zirconium-based catalysts. Tin-based catalysts have been found to significantly reduce the amount of outgassing during formation of the polyurethane. Examples of tin-based catalysts include dibutyltin compounds such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. If present, any catalyst is typically included at levels of at least 200 parts per million by weight (ppm), 300 ppm, or more; however, this is not a requirement.

Additional suitable two-part urethanes are described in U.S. Pat. No. 6,258,918 B1 (Ho et al.) and U.S. Pat. No. 5,798,409 (Ho), the disclosures of which are incorporated herein by reference.

In general, the amounts of polyisocyanate to polyol, polyamine, and/or aminoalcohol in a two-part urethane are selected in approximately stoichiometrically equivalent amounts, although in some cases it may be desirable to adjust the relative amounts to other ratios. For example, a slight stoichiometric excess of the polyisocyanate may be useful to ensure a high degree of incorporation of the polyol, polyamine, and/or aminoalcohol, although any excess isocyanate groups present after polymerization will typically react with materials having reactive hydrogens (for example, adventitious moisture, alcohols, amines, etc.).

Base layer 130 may further comprise one or more optional additives such as, for example, flame retardants, fillers, antioxidants, UV light absorbers, hindered amine light stabilizers (HALS), plasticizers, and rheology modifiers.

In some embodiments, base layer 130 may contain one or more volatile organic solvents, typically in amounts of less than about 5 percent, more typically less than one (1) percent, more typically less than 0.5 percent, and even more typically in an amount of less than 0.3 or even 0.1 percent, or base layer 130 may even be essentially solvent-free.

Base layer 130 may have any thickness and may be coextensive in boundaries with the thermoformable substrate, or it may be disposed on only a portion or separate portions of a major surface of the thermoformable substrate. Typically, the thickness of base layer 130 has a thickness of from about 0.3 mil (8 micrometers) to about 20 mils (0.51 millimeters), and more typically from about 3 mil (80 micrometers) to about 7 mils (0.2 millimeters).

Advantageously, base layer 130 may be substantially or even essentially isotropic, and/or substantially or even essentially solvent-free, for example, if made according to at least some embodiments of methods according to the present disclosure. This is a typical result of polymerizing a base layer precursor between two forming webs under conditions wherein no orientation of the resultant base layer 130 occurs, and even in the event that a volatile organic solvent is present, no volatile organic solvent gradient is formed due to evaporation as occurs during solvent casting.

Alternatively, or in addition, each of the first and second major surfaces of base layer 130 may be a substantial inverse image of a major surface of a corresponding forming web, for example, if made according to at least some embodiments of methods according to the present disclosure. This feature may directly result from forming base layer 130 between two forming webs such that polymerization of a base layer precursor occurs to form base layer 130 while it is in intimate contact with major surfaces of two corresponding forming webs, thereby imparting a predetermined surface topography to the first and second major surfaces (142, 144) of base layer 130, the predetermined topography of each being a substantial inverse image of the major surface of a corresponding web forming substrate. In some embodiments, the forming webs may comprise releasable liners (release liners). In some embodiments, the thermoformable substrate comprises one of the forming webs. In some embodiments, the thermoformable substrate and optional adhesive layer comprise one of the forming webs.

Figure 5:
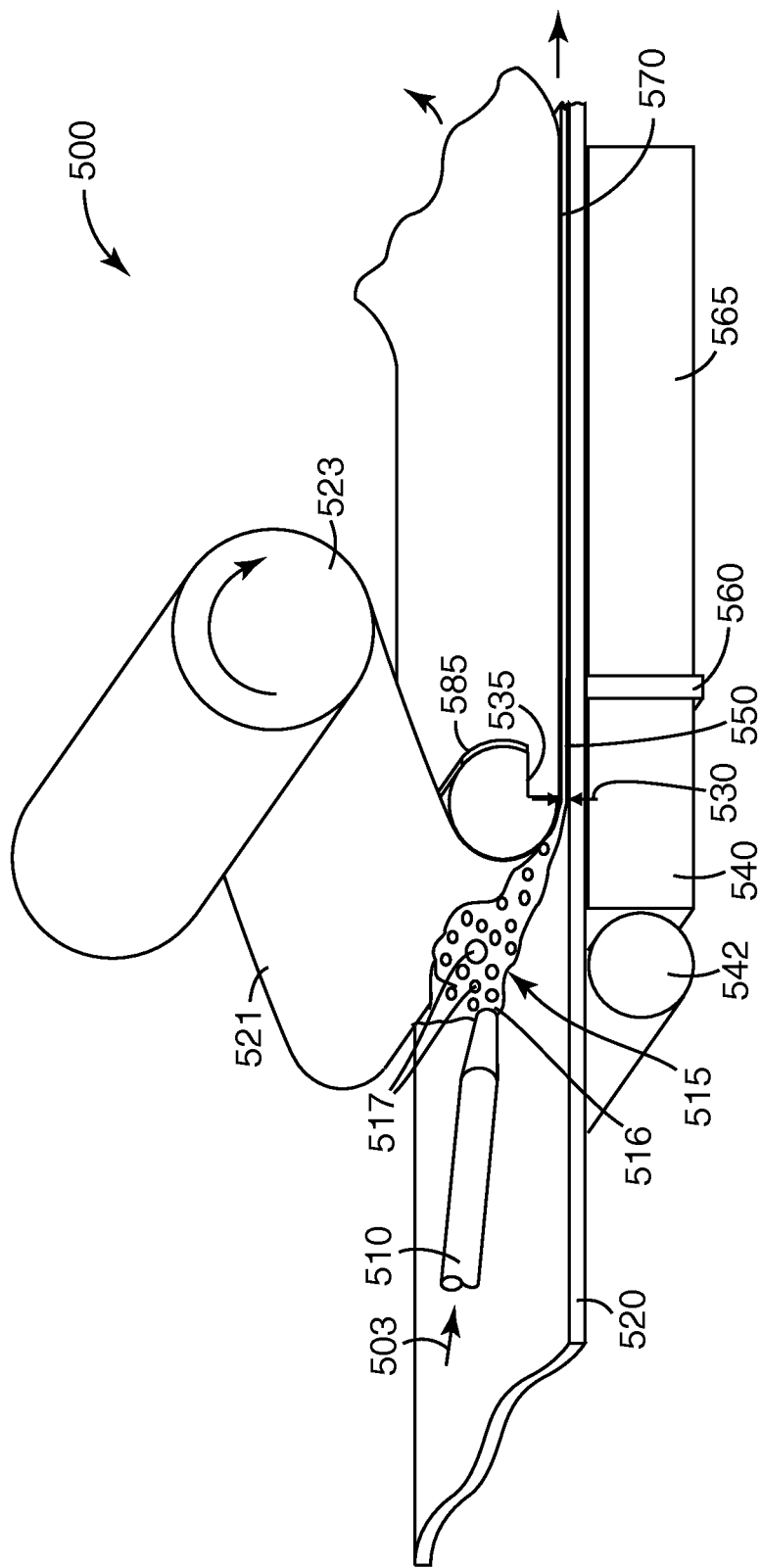
FIG. 5 is a perspective schematic side-view showing an exemplary method of forming a multilayer article according to the present disclosure.

In certain embodiments, for example, if made according to methods of the present disclosure generally shown in FIG. 5, base layer 130 may be essentially free of visible surface defects, that is, free of surface defects that are noticeable to an unaided human eye, with normal 20/20 vision, at a distance of 0.3 meter.

Base layer 130 may have any desired appearance, for example, ranging from matte to glossy. If base layer 130 forms an exterior surface of the multilayer article it may be desirable that the second major surface of base layer 130 has a 60 degree gloss according to ASTM Test Method D2457-03 "Standard Test Method for Specular Gloss of Plastic Films and Solid Plastics" of at least about 60 gloss units, and typically at least about 80 gloss units, in substantially all areas of the second major surface of base layer 130, including those that have been permanently deformed (that is, strained). Similarly, if base layer 130 forms an exterior surface of the multilayer article it may be desirable that the second major surface of base layer 130 has a distinctness of image according to ASTM Test Method D5767-95 "Standard Test Methods for Instrumental Measurement of Distinctness-of-Image Gloss of Coating Surfaces" of at least about 60, and typically at least about 80, in substantially all areas of the second major surface of base layer 130, including those that have been permanently deformed.

In some embodiments, the second major surface of base layer 130 exhibits surface shape recovery. As used herein, the term "surface shape recovery" refers to the ability of a surface of a material (for example, a base layer or a transparent protective layer) to rapidly recover from indentations made therein to its prior non-indented visual appearance, either spontaneously or upon heating. Without wishing to be bound by theory, it is believed that surface shape recovery results at least in part from the existence of a three-dimensional crosslink network (either chemical or physical) formed by polymeric material (for example, in base layer 130 or transparent protective layer 250), where the crosslinks are separated by flexible segments with sufficient molecular weight that the segments at least collapse into random coils as initially formed but extend linearly if deformed (for example, indented). Upon standing or heating the material returns to its original dimensions; in the case of a surface of a layer of such a polymeric material the surface will recover its original appearance.

Examples of segments capable of this behavior include segments in polyurethanes that are derived from polyester diols or polyether diols having molecular weight on the order of at least about 1500, 2000, 2500, or even at least about 3000 grams per mole, or more.

Optional Transparent Protective Layer 150

Optionally, a transparent protective layer 150 may be present in combination with base layer 130. The transparent protective layer may comprise any material capable of forming a transparent film. Examples include any materials known for use as clear coats or clear coat films in the automotive industry. Clear coats can be applied, for example, by casting out of solvent. Clear coat films (typically having a pressure sensitive adhesive layer on a major surface thereof) may be laminated using conventional techniques.

Additional examples of materials suitable for use in forming the transparent protective layer 150 include transparent polyurethanes described in U.S. Pat. No. 6,258,918 B1 (Ho et al.) and U.S. Pat. No. 5,798,409 (Ho).

The optional transparent protective layer 150 may have any thickness and may be coextensive in boundaries with base layer 130, or it may be disposed on only a portion or separate portions of the second major surface of base layer 130. Typically, the thickness of the transparent protective layer 150 has a thickness of from about 0.4 mil (10 micrometers) to about 30 mils (0.76 millimeters), and more typically from about 6 mil (200 micrometers) to about 14 mils (0.36 millimeters).

Optional Protective Liner 180

An optional protective liner 180 may be present in contact with and releasably adhered to with the outermost of the second major surface of base layer 130 or the second major surface of the optional transparent layer (if present). Suitable protective liners include, for example, polymer sheets, films, or papers, optionally coated with an adhesive or a low surface energy coating. Suitable low surface energy coatings may include, for example, those formed from polyacrylics, silicones, and/or fluorochemicals.

Figure 2:
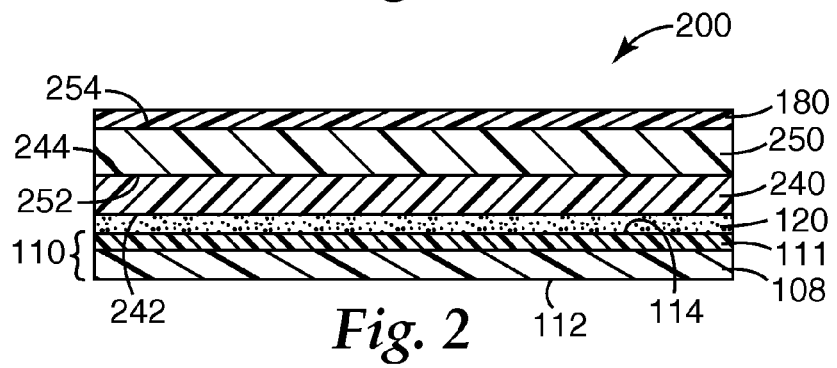
FIG. 2 is a side-view of an exemplary multilayer article according to the present disclosure.

Additional exemplary embodiments of multilayer articles are broadly shown in FIG. 2. Referring now to FIG. 2, multilayer article 200 comprises thermoformable substrate 110, optional adhesive layer 120, and base layer 240. Base layer 240 has first major surface 242 and second major surface 244 opposite first major surface 242. In various embodiments, base layer 240 may contact and be permanently adhered to thermoformable substrate 110, or it may be permanently adhered to thermoformable substrate 110 by optional adhesive layer 120. In some embodiments, thermoformable substrate 110 includes optional tie layer 111 (comprising second major surface 114) and bulk portion 108. Transparent protective layer 250 has first major surface 252 and second major surface 254. First major surface 252 of transparent protective layer 250 contacts and is permanently adhered to second major surface 244 of base layer 240. If present, optional protective liner 180 is releasably adhered to second major surface 254 of transparent protective layer 250.

In these embodiments, thermoformable substrate 110, optional adhesive layer 120, and optional protective liner 180, are as described above.

Base Layer 240

Base layer 240 comprises a polymeric material. In some embodiments, base layer 240 is the same as base layer 130, while in other embodiments it is different.

Examples of polymeric materials useful in base layer 240 include all those suitable for use in base layer 130, but may also include in addition, or in place of, other polymeric materials not suitable for achieving the desired characteristics of base layer 130. For example, base layer 240 may be formed from extruded thermoplastic materials comprising, for example, one or more thermoplastic polyolefins, thermoplastic polyurethanes, thermoplastic acrylics, thermoplastic fluoropolymers, thermoplastic polyamides, thermoplastic polyesters, thermoplastic polycarbonates, or a combination thereof. Also, base layer 240 may be formed by solvent casting methods, for example, using gravure coating. In such cases, base layer 240 typically comprises one or more colorants dispersed in a polymeric binder, which may be thermoplastic or thermoset. Examples of polymeric binders include acrylics, urethanes, silicones, polyethers, phenolics, aminoplasts, and combinations thereof. Base layer 240 may also be formed by printing an ink.

Base layer 240 may further comprise one or more optional additives such as, for example, flame retardants, fillers, antioxidants, UV light absorbers, hindered amine light stabilizers (HALS), plasticizers, and rheology modifiers.

In some embodiments, base layer 240 may contain one or more volatile organic solvents, typically in amounts of less than about 5 percent, more typically less than one (1) percent, more typically less than 0.5 percent, and even more typically in an amount of less than 0.3 or even 0.1 percent, or base layer 240 may even be essentially solvent-free.

Base layer 240 may have any thickness and may be coextensive in boundaries with the thermoformable substrate, or it may be disposed on only a portion or separate portions of a major surface of the thermoformable substrate. Typically, the thickness of base layer 240 has a thickness of from about 0.3 mil (8 micrometers) to about 20 mils (0.51 millimeters), and more typically from about 3 mils (80 micrometers) to about 7 mils (0.2 millimeters).

Transparent Protective Layer 250

Transparent protective layer 250 is first of all transparent, although it may be colored, or more typically essentially colorless.

Examples of polymeric materials useful in transparent protective layer 250 include all those suitable for use in base layer 130, except that little or no colorant would be incorporated.

Transparent protective layer 250 may have any thickness and may be coextensive in boundaries with base layer 240, or it may be disposed on only a portion or separate portions of the second major surface of base layer 240. Typically, the thickness of the transparent protective layer 250 has a thickness of from about 0.4 mil (10 micrometers) to about 30 mils (0.76 millimeters), and more typically from about 6 mil (0.2 millimeters) to about 14 mils (0.36 millimeters).

Advantageously, transparent protective layer 250 may be substantially or even essentially isotropic, and/or substantially or even essentially solvent-free, for example, if made according to at least some embodiments of methods according to the present disclosure. This is a typical result of polymerizing a transparent protective layer precursor between two forming webs under conditions wherein no orientation of the resultant transparent protective layer 250 occurs, and even in the event that a volatile organic solvent is present, no volatile organic solvent gradient is formed due to evaporation as occurs during solvent casting.

Alternatively, or in addition, each of the first and second major surfaces of transparent protective layer 250 may be a substantial inverse image of a major surface of a corresponding forming web, for example, if made according to at least some embodiments of methods according to the present disclosure. This feature may directly result from forming transparent protective layer 250 between two forming webs such that polymerization of a transparent protective layer precursor occurs to form transparent protective layer 250 while it is in intimate contact with major surfaces of two corresponding forming webs, thereby imparting a predetermined surface topography to the first and second major surfaces (252, 254) of transparent protective layer 250, the predetermined topography of each being a substantial inverse image of the major surface of a corresponding web forming substrate. In some embodiments, the forming webs may comprise releasable liners (release liners). In some embodiments, the thermoformable substrate comprises one of the forming webs. In some embodiments, the thermoformable substrate and optional adhesive layer comprise one of the forming webs.

In certain embodiments, for example, if made according to methods of the present disclosure generally shown in FIG. 5, transparent protective layer 250 may be essentially free of visible surface defects.

Transparent protective layer 250 may have any desired appearance, for example, ranging from matte to glossy. If transparent protective layer 250 forms an exterior surface of the multilayer article it may be desirable that the second major surface of base layer 130 has a 60 degree gloss according to ASTM Test Method D2457-03 "Standard Test Method for Specular Gloss of Plastic Films and Solid Plastics" of at least about 60 gloss units, and typically at least about 80 gloss units, in substantially all areas of the second major surface of base layer 130, including those that have been permanently deformed (that is, strained). Similarly, if transparent protective layer 250 forms an exterior surface of the multilayer article it may be desirable that the second major surface of transparent protective layer 250 has a distinctness of image according to ASTM Test Method D5767-95 "Standard Test Methods for Instrumental Measurement of Distinctness-of-Image Gloss of Coating Surfaces" of at least about 60, and typically at least about 80, in substantially all areas of the second major surface of transparent protective layer 250, including those that have been permanently deformed.

Since it may have essentially the same composition as base layer 130, in some embodiments, the second major surface of transparent protective layer 250 likewise exhibits surface shape recovery.

Colorant

In certain embodiments of multilayer articles according to the present disclosure, at least one of the substrate and/or at least one layer of the multilayer article further comprises a colorant. Depending on the amount of colorant, and the thickness of any colored layer or substrate, the substrate, or affected layer may be transparent, translucent or opaque. For example, a combination of a base layer (for example, 130 or 240) and the thermoformable substrate may be opaque or translucent.

Examples of colorants include any colorants known in the automotive or graphic arts (for example, high performance or automotive grade pigments (whether colored, white, or black), pearlescent pigments, titanium dioxide, carbon black, metal flakes, dyes, and combinations thereof). Typically, the colorant is selected to have acceptable lightfastness and weathering characteristics for the intended use of the multilayer article as well as compatibility with the other components of the base layer. Combinations of more than one colorant may be used. Sufficient colorant should be used that base layer 130 in the multilayer article is opaque or translucent; however, excessive amounts of colorant may tend to degrade physical properties of base layer 130. Typically, the amount of colorant will be less than about 20, 15, 10, 7, or 5 percent of the total weight of base layer 130, but this is not a requirement.

Metal flake containing paints known as "metallic" paints are a highly specialized class of paint. They are widely used to provide glitz and glamour to automobile manufacturers' products. The special appearance of metallic paints results from the random orientation of the metal flakes within the paint coating. This random orientation results directly from the presence and evaporation of the solvent from the paint. Convection currents within the paint are established as the solvent evaporates from the surface of the paint which causes the paint surface to cool which then causes the surface paint to thermally sink within the paint where it can capture heat from the paint and rise back to the surface where more solvent evaporates, repeating the process. This circulates the metal flakes within the coating causing their orientation to randomize, thereby achieving the desired appearance. Extrusion processes orient pigments such as metal flake and are generally not able to achieve an excellent appearance. Advantageously, in some embodiments, methods according to the present disclosure are useful for preparing "metallic" multilayer articles that achieve an appearance comparable to that obtained by solvent coating techniques.

Method of Making Shaped Articles

Figure 3:
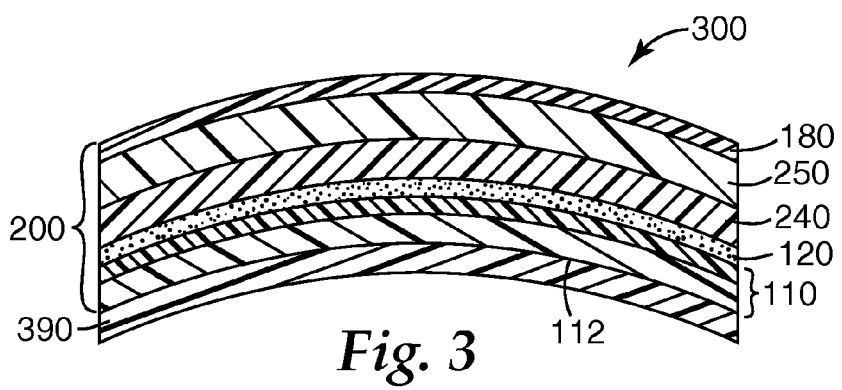
FIG. 3 is a side-view of a thermoformed exemplary multilayer article according to the present disclosure.

FIG. 3 depicts a shaped article 300 formed by a method including thermoforming and optionally injection cladding multilayer article 200. While a simple deformation is shown, it will be recognized that complex three-dimensional shapes may also be formed.

Optional injection cladding 390 contacts and is permanently adhered to first major surface 112 of thermoformable substrate 110.

Optional Injection Cladding 390

If present, injection cladding 390 is produced through a process of injection cladding (discussed hereinbelow). Examples of materials suitable for use as injection cladding include filled or unfilled polymers such as high impact modified polystyrenes, acrylonitrile butadiene styrene copolymers, polyamides, polyesters, polypropylenes, polyethylenes, polyurethanes, polyether ether ketones, polyimides, polyetherimides, and combinations thereof.

Multilayer articles according to the present disclosure may be, for example, two dimensional sheets, rolls, or they may be permanently deformed into 3-dimensional simple or complex shapes.

Multilayer articles according to the present disclosure are typically thermoformable, although this not a requirement.

There are two general thermoforming process categories. Sheet thickness less than 1.5 mm (thin gauge) is usually delivered to a thermoforming press in rolls. Sheet thickness greater than 3 mm (0.120 inches) is usually delivered to a forming press cut to final dimensions and stacked on pallets. Heavy-gauge thermoforming typically uses convection oven heating of the sheet and draping of the sheet over male, female, or paired molds. Heavy-gauge parts may be useful, for example, as cosmetic surfaces on permanent structures such as automobiles, refrigerators, spas and shower enclosures, and electrical and electronic equipment.

Useful thermoforming techniques include, for example, vacuum forming, free forming, drape forming, plug and ring forming, vacuum snap-back forming, air slip forming, plug assist forming, twin-sheet forming, pressure forming, bend forming, billow forming, blow forming, and compression forming (for example, matched mold forming). The foregoing methods are well known in the thermoforming art.

After thermoforming, multilayer articles according to the present disclosure may be adhered to a panel (for example, an automotive body panel) by placing it into a mold and injecting a molten material that solidifies by cooling (injection molding) and or thermosetting (reaction injection molding) against the thermoformable substrate in a process known as injection cladding. The end result is a molded panel with a quality exterior finish.

Materials that can be used for injection cladding of multilayer films according to the present disclosure include, for example, filled or unfilled polymers such as high impact modified polystyrenes, acrylonitrile butadiene styrene copolymers, polyamides, polypropylenes, polyethylenes, polyurethanes, polyether ether ketones, polyimides, polyetherimides, and combinations thereof.

Advantageously, and surprisingly, multilayer articles according to the present disclosure can be formulated such that they can endure the stresses and temperatures of thermoforming and maintain a functional base layer and, if present, transparent protective layer, and provide aesthetically desirable appearance having a high quality appearance, comparable or better in appearance to a corresponding painted surface, and that is suitable for use "as is" in various applications such as, for example, vehicle body parts. Further, in some embodiments, the resultant article exhibits surface shape recovery, which facilitates maintenance of the surface appearance during normal use.

For example, multilayer articles according to the present disclosure may be capable of being permanently deformed by bending at an angle of at least 20, 30, 45, 60, 70, or even 90 degrees around a mandrel resulting in a radius of curvature of the bend angle of 1, 2, 3, 5, or 10 centimeters, or more, without cracking or splitting and while retaining at least 50, 60, 70, 80, or even 90 percent or more of gloss and distinctness of image prior to deformation.

The number of shaped articles formable from multilayer articles according to the present disclosure is virtually unlimited. Examples of shaped articles that can be formed by permanently deforming embodiments of multilayer articles according to the present disclosure include vehicle trim (interior trim and/or exterior trim), architectural trim, appliance (for example, a refrigerator, stove, washer, or dryer) housings or a portion thereof, and vehicle body parts.

Figure 4:
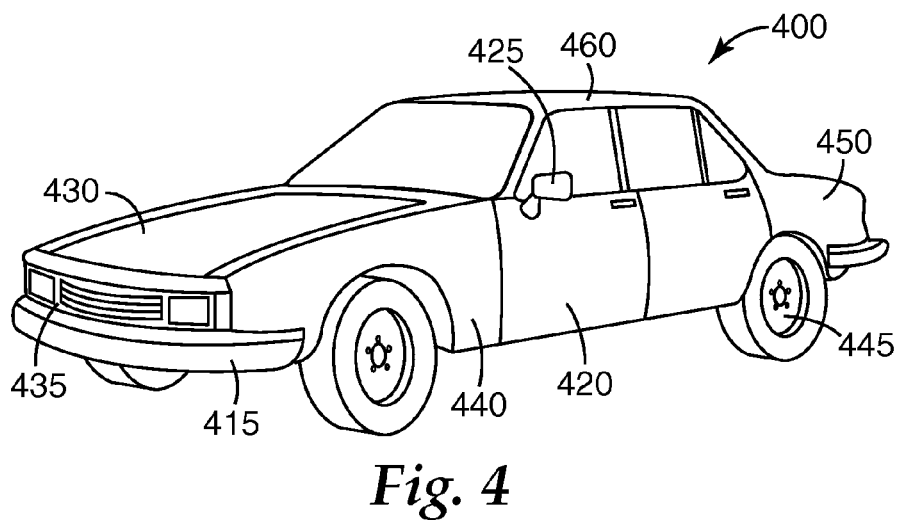
FIG. 4 is a perspective view of an automobile showing multilayer article according to the present disclosure shaped into vehicle body parts and trim.

Representative automobile body parts are shown in FIG. 4 on automobile 400, specifically roof 460, hood 430, quarter panels 440 and 450, and door 420. These and other vehicle body parts may be operatively adapted (that is, dimensioned and designed) for forming part of a land vehicle, aircraft, or watercraft. For example, the vehicle body part may be a body part of at least one vehicle selected from the group consisting of automobiles, trucks, bicycles, boats, snowmobiles, all-terrain vehicles, motorcycles, airplanes, helicopters, hovercraft, buses, trolleys, and railroad cars.

Representative examples of vehicle trim are also shown in FIG. 4, specifically bumper 415, mirror 425, grill 435, and wheel cover 445. Additional examples of vehicle trim include: interior trim components such as, for example, dashboard panels and consoles; and exterior components such as fender extensions, hub caps, trim rings for wheels, lamp housings, window lace (window surround), and other exterior facia components.

Methods of Making

FIG. 5 illustrates an exemplary process 500 for forming paint film composites according to the present invention and/or component layers thereof. Referring now to FIG. 5, reactive component(s) 503 is/are fed into dynamic mixer 510. The mixed components combine to form reactive composition 516 which is fed to rolling bank 515. While a typical method of forming reactive composition 516 is shown, it will be recognized that other suitable methods (for example, mechanical stirring) may also be used. Rolling bank 515 is disposed between first forming web 520 (which passes over roller 542) and second forming webs 521 which is unwound from feed roll 523, although other feed arrangements are also possible (especially if thermoformable substrate is used as one forming web). While the process depicted is typical for flexible forming webs, it will be recognized that individual sheets of thermoformable substrate may also be fed into the nip in like manner, but using a different feeding arrangement. First forming web 520 (after passing roller 542) and second forming web 521 advance toward and pass through nip 530.

As first and second forming webs 520, 521 pass through nip 530 formed by first metering element 540 (a platen) and second metering element 535 (a notch bar), entrapped air bubbles 517 are substantially or completely removed to give thin reactive film 550 sandwiched between first and second forming webs 520, 521. First and second metering elements 540, 535 define a nip gap 530.

After passing insulation barrier 560, thin reactive film 550 contacts heated platen 565 which facilitates curing of reactive composition 516 to form thin film 570 sandwiched between first and second forming webs 520, 521.

Multilayer articles according to the present disclosure can be made using exemplary process 500 in a variety of permutations. For example, in one embodiment thermoformable substrate stock may be one forming web and thin film 570 results in base layer 130.

In another exemplary embodiment, both forming webs may be release liners and thin film 570 results in base layer 130. After removing one of the forming webs adhesive is applied to the exposed surface of base layer 130, and the adhesive coated base layer is adhered to a thermoformable substrate stock.

In another exemplary embodiment, one forming webs may be thermoformable substrate with a base layer 240 contacting and permanently adhered thereto and the other forming web is a release liner. Thin film 570 results in transparent protective layer 250.

It will be at once apparent that numerous specific combinations are possible. Other forming webs include, for example, adhesive coated thermoformable substrate and adhesive coated protective liners.

Typically, reactive composition 516 generates heat as it reacts, the temperature of the rolling bank rises to a temperature above ambient. Hence, over time during a continuous process the temperature of rolling bank 515 rises until a steady state temperature is reached that balances heating and cooling effects on the rolling bank. Until the steady state is reached, the gap typically dynamically changes with time, which results in a thin film of varying thickness and profile. To mitigate this problem, at least a portion of at least one of first and second metering elements 540, 535, proximate the rolling bank is independently heated to a temperature, desirably at or above the contemporaneous temperature of the rolling bank, although less heating may also be used. As exemplified in FIG. 5, this may be accomplished using heating tape 585 secured to second metering element 535. This heating has the effect of reducing the time necessary to reach steady state operation and its attendant start up waste, and optionally thin film uniformity, especially in applications where uniform thickness of the thin film is important.

In some embodiments, (for example, those wherein one or both of the first and second forming webs 520, 521 are both release liners) one or both of the first and second forming webs 520, 521 is then removed to expose one or both surfaces of the thin film.

Suitable forming webs include those films which have sufficient integrity and flexibility to form and support the reactive thin film. The forming web may have any thickness as long as it has sufficient integrity and flexibility to be used in methods according to the present invention. In general, the films should be substantially continuous and nonporous, although in some cases, some porosity (for example, microporosity) may be acceptable. Examples of suitable forming webs include papers (including treated papers); foils; and polymeric films such as polyester films (for example, PET polyester films or polycaprolactone films), polycarbonate films, cellulosic films (for example, cellulose films), polyamide films, polyolefin films (for example, polyethylene films or polypropylene films), polyamide films, polyimide films, polyvinyl chloride films, or other polymer films; and combinations thereof.

If one or both of the forming webs is intended to function as a release liner, it may be treated with a release agent such as, for example, a silicone or a fluorochemical. A wide variety of suitable release liners are known in the art, and many are commercially available.

The first and second metering elements may have any suitable form. Exemplary metering elements include bars, notched bars, rolls, platens, slabs, doctor blades, knife edges, and combinations thereof. In general, they should be selected and positioned such that they form a substantially uniform gap prior to formation of the rolling bank.

The method depicted in FIG. 5 can be used to form thin films of a variety of thicknesses (for example, thicknesses up to one millimeter or more).

One or more of the metering elements may be heated directly or indirectly by any appropriate method including, for example, electrical heating (for example, by resistive heating coils or a heating tape), steam, infrared radiation, oil heating, thermal conduction, or induction heating. Heat may be supplied internally or externally to the first and/or second metering elements. Heating may be provided uniformly or non-uniformly along the length(s) of the first and/or second metering elements. For example, one or both of the ends of the metering element(s) may be independently heated more than the portion of the metering element(s) proximate to the rolling bank.

If heated the temperature of the first and/or second metering elements generally should not be sufficiently high that excessive curing of the rolling bank occurs.

Objects and advantages of this invention are further illustrated by the following non-limiting examples, but the particular materials and amounts thereof recited in these examples, as well as other conditions and details should not be construed to unduly limit this invention.

EXAMPLES

Unless otherwise noted, all parts, percentages, ratios, etc. in the Examples and the rest of the specification are by weight.
Table 1, below, lists materials used in the examples.

TABLE 1

| MATERIAL | DESCRIPTION |
|---|---|
| Alberdingk U 933 | a water-based polyurethane available as Alberdingk U 933 from Alberdingk Boley, Greensboro, NC. |
| APU 1014 | acrylic modified polyester-polyurethane dispersion available as Alberdingk APU 1014 from Alberdingk-Boley. |
| Admex 770 | medium-to-high molecular weight polymeric plasticizer based on adipic acid and phthalic acid available as Admex 770 from Velsicol Chemical Corporation, Rosemont, IL. |
| AMP 95 | 2-amino-2-methyl-1-propanol available as AMP 95 from Angus Chemical Co., Midland, MI. |
| Bayhydrol 122 | a water based polyurethane available as Bayhydrol 122 from Bayer Corp., Pittsburgh, PA. |
| Black Polypropylene Sheet | 508 micrometer impact modified polypropylene sheet, 98% 9403 resin available from Huntsman Chemical, Salt Lake City, UT and 2% 1000110S black concentrate available from Clariant Corp., Holden, MA. |
| Capa 2054 | a linear polyester diol, molecular weight = 550 g/mole, available as Capa 2054 from Perstorp UK Limited, Warrington, Cheshire, UK. |

TABLE 1-continued

| MATERIAL | DESCRIPTION |
|---|---|
| Capa 3031 | a polycaprolactone polyester triol, molecular weight = 300 g/mole, available as Capa 3031 from Perstorp UK Limited. |
| Capa 3050 | a polycaprolactone polyester triol, molecular weight = 540 g/mol, available as Capa 3050 from Perstorp UK Limited. |
| cellulose acetate butyrate-381-0.1 | a leveling agent available as cellulose acetate butyrate-381-0.1 from Eastman Chemical Co. of Kingsport, TN. |
| Cosorb MOH | UV light absorber available as Cosorb MOH from 3M Company, St. Paul, MN. |
| Cosorb OSG | UV light absorber available as Cosorb OSG from 3M Company. |
| Cromophtal Brown 5R | azo condensate pigment available as Cromophtal Brown 5R from Ciba Specialty Chemicals Corporation, High Point, NC. |
| Dabco T-12 | urethane catalyst, dibutyltin dilaurate, available as Dabco T-12 from Air Products and Chemicals, Allentown, PA. |
| Desmodur N 3300A | aliphatic polyisocyanate based on hexamethylene diisocyanate, equivalent weight = 195 g/eq available as Desmodur N 3300A from Bayer Corp., Pittsburgh, PA |
| Desmodur N 3390 | aliphatic polyisocyanate based on hexamethylene diisocyanate, equivalent weight = 214 g/eq available as Desmodur N 3390 from Bayer Corp. |
| Desmodur N 3600 | aliphatic polyisocyanate based on hexamethylene diisocyanate, equivalent weight = 183 g/eq available as Desmodur N 3600 from Bayer Corp. |
| Desmodur W | bis(4-isocyanatocyclohexyl)methane diisocyanate available as Desmodur W from Bayer Corp. |
| Disperplast P | high molecular weight unsaturated polycarboxylic acid pigment dispersing agent available as Disperplast P from BYK-Chemie USA, Wallingford, CT. |
| DMA | N,N-dimethylacrylamide |
| EC3960 | epoxy primer available as Scotch-Weld Structural Adhesive Primer EC-3960 from 3M Company, St. Paul, MN. |
| Edenol 9777 | polymeric plasticizer based on 1,3-butanediyl polyadipate with 2-ethylhexanol available as Edenol 9777 from Cognis Oleochemicals LLC, Cincinnati, OH. |
| Ferro Black | 15-40 weight percent carbon black dispersed in unsaturated polyester, available as Ferro Black (color no. 11-8805) from Ferro Corp., Edison, NJ. |
| Fomrez 55-112 | a polyester diol based on neopentyl glycol adipate, molecular weight = 1000 g/mole, available as Fomrez 55-112 from Chemtura Corp., Middlebury, CT. |
| Fomrez 55-225 | a polyester diol based on neopentyl glycol adipate, molecular weight = 500 g/mole, available as Fomrez 55-225 from Chemtura Corp., Middlebury, CT. |
| HEA | 2-hydroxyethyl acrylate available from Cognis, Cincinnati, OH. |
| Irgacolor Yellow 2GLMA | bismuth vanadate pigment available as Irgacolor Yellow 2GLMA from Ciba Specialty Chemicals Corporation, High Point, NC. |
| Joncryl-578 | an acrylic polyol available as Joncryl-578 from BASF Corp., Florham Park, NJ. |
| Keyplast FL Yellow FPGN | fluorescent dye available as Keyplast FL Yellow FPGN from Keystone Aniline Corporation, Chicago, IL. |
| K-Flex 188 | a polyester diol, molecular weight = 488 g/mole, available as K-Flex 188 from King Industries Inc., Norwalk, CT. |
| K-Flex XM-308 | a linear, saturated polyester diol, molecular weight = 432 g/mole, available as K-Flex XM-308 from King Industries Inc., Norwalk, CT. |
| Krasol LBH 3000 | hydrogenated hydroxyl-terminated butadiene supplied by Sartomer, Exton, PA. |
| Macromelt 6240 | polyamide polymer hot melt adhesive available as Macromelt MM-6240 from Henkel, Mississauga, ON, Canada. |
| Macromelt MM-6240 | polyamide polymer hot melt adhesive available as Macromelt MM-6240 from Henkel Adhesives, Elgin, IL. |
| Metacure T-12 | dibutyltin dilaurate catalyst available as Metacure T-12 from Air Products and Chemicals, Allentown, PA. |
| Monolite Green 674 | copper phthalocyanine pigment available as Monolite Green 674 from Heucotech Ltd., Fairless Hills, PA. |

TABLE 1-continued

| MATERIAL | DESCRIPTION |
| --- | --- |
| Neocryl CX-100 | a polyaziridine crosslinker available as Neocryl CX-100 from DSM NeoResins of Wilmington, MA. |
| Orange 11Y692 | orange pigment dispersion available as Orange 11Y692 from Penn Color, Doylestown, PA. |
| Paraloid EXL2600 | a methacrylate/styrene/butadiene core-shell polymer available as Paraloid EXL2600 from Rohm and Haas Co., Philadelphia, PA. |
| PC-1667 | a polycarbonate diol, molecular weight 860 g/mole, available as PC-1667 from Stahl USA, Peabody, MA. |
| Raven 1200 Black | black pigment dispersion, 10% Raven 1200 carbon black from Evonik-Degussa, Chester, PA, in 90% Fomrez 55-225. |
| RD 2788 | an automotive grade acrylic pressure-sensitive adhesive transfer tape. |
| Reversacol Graphite | photochromic dye available as Reversacol Graphite from Keystone Aniline Corporation, Chicago, IL. |
| 4298 UV Adhesion Promoter | an adhesion promoter available as Scotch-Mount 4298 UV Adhesion Promoter from 3M Company. |
| Silberline GP 142 SV | silver holographic flake pigment, 12 micrometers × 100 micrometers × 50 micrometers, available as Silberline GP 142 SV from Silberline, Tamaqua, PA. |
| T10 Release Liner | a 2-mil (50-micrometer) single side release (silicone coated) polyester liner, available as Clearsil Release Liner T10 from CPFilms, Martinsville, VA. |
| Tinuvin 123 | bis-(1-octyloxy-2,2,6,6-tetramethyl-4-piperidinyl) ester available as Tinuvin 123 from Ciba Specialty Chemicals, Tarrytown, NY. |
| Tinuvin 292 | bis(1,2,2,5,6-pentamethyl-4-piperidinyl) sebacate available as Tinuvin 292 from Ciba Specialty Chemicals. |
| Tinuvin 328 | a UV light absorber, 2-(2H-benzotriazol-2-yl)-4,6-ditertpentylphenol available as Tinuvin 328 from Ciba Specialty Chemicals. |
| Tinuvin 405 | UV light absorber, 2-[4-[(2-hydroxy-3-(2'-ethyl)hexyl)oxy]-2-hydroxyphenyl]-4,6-bis(2,4-dimethylphenyl)-1,3,5-triazine available as Tinuvin 405 from Ciba Specialty Chemicals. |
| TI-PURE R-960 | titanium dioxide pigment available as TI-PURE R-960 from E. I. du Pont de Nemours and Co., Wilmington, DE. |
| TMPTA | trimethylolpropane triacrylate available from Sartomer Co., Exton, PA. |
| Tone 2221 | a linear polycaprolactone polyol, molecular weight = 1000 g/mole, available as Tone 2221 from Dow Chemical Co., Midland, MI. |
| Tone 301 | a caprolactone triol, molecular weight = 300 g/mole, available as Tone 301 from Dow Chemical Co. |
| Tone 305 | a caprolactone triol, molecular weight = 550 g/mole, available as Tone 305 from Dow Chemical Co. |
| Triton GR-7M | a surfactant available as Triton GR-7M from Dow Chemical Co., Midland, MI. |
| Unoxol Diol | cycloaliphatic diol available as Unoxol Diol from Dow Chemical Co. |
| Urethhall 4050-55 | a polyester diol, molecular weight = 2040 g/mole, available as Urethhall 4050-55 from HallStar Co., Chicago, IL. |
| Uvitex OB | optical brightener available as Uvitex OB from Ciba Specialty Chemicals Corporation, High Point, NC. |

Series 100 Examples

Preparative Example 101

A pigment dispersion paste was prepared that consisted of 19.8 parts of Cromophtal Brown 5R pigment, 0.99 part Disperplast P and 79.21 parts ADMEX 770. This mixture was first blended using a paddle mixer until a uniform consistent paste condition was reached, then ground using a 3-roll paint mill until a pigment grind of greater than or equal to 7.0 was reached according to ASTM D1210-05 "Standard Test Method for Fineness of Dispersion of Pigment-Vehicle Systems by Hegman-Type Gage".

Preparative Example 102

A pigment dispersion paste was prepared as described in Preparative Example 101, except the mixture consisted of 22.87 parts Monolite Green 674, 0.91 part Disperplast P, and 76.22 parts ADMEX 770.

Preparative Example 103

A pigment dispersion paste was prepared as in Preparative Example 101 except the mixture consisted of 54.64 parts Irgacolor Yellow 2GLMA, 2.73 parts Disperplast P, and 42.63 parts ADMEX 770.

Preparative Example 104

A pigment dispersion paste was prepared as described in Preparative Example 101, except the mixture consisted of 57.8 parts TI-PURE R-960, 1.7 parts Disperplast P, and 40.5 parts Edenol 9777.

Preparative Example 105

A dye mixture was prepared by dissolving 1 part Reversacol Graphite dye into 99 parts K-Flex 188. The mixture was placed in a 70° C. oven for 24 hours which resulted in the dissolution of the dye in the K-Flex 188.

Preparative Example 106

A centrifugal resin mixer available as FlackTek Speedmixer DAC 150 FV from FlackTek Inc., Landrum, S.C., was used to mix 9.63 grams of K-Flex 188 with 8 grams of Desmodur N 3300A and 0.0368 grams of Dabco T-12 at a speed of 3450 rpm in a Max 40 mixing cup, available from FlackTek Inc. The mixture was then coated using a notched bar flatbed coating apparatus, as generally shown in FIG. 5, using a T10 silicone release coated, 63.5 micrometer thickness polyester release liner (CPFilms Inc., Martinsville, Va.) both above and below the coating mixture. The thickness of the gap between the notched bar and the flatbed was set at 127 micrometers. The mixture was poured onto the flatbed portion of the coating apparatus and the liners were pulled through the gap which created a rolling bank of the coating mixture. After going through the gap, the sample between the two liners was set aside and allowed to cure under ambient conditions for a minimum of 24 hours. The resulting film was a crosslinked polyurethane with a system functionality of 2.51 and with an isocyanate to polyol ratio of 1.05.

Preparative Examples 107-116

Preparative Example 106 was repeated for each example, except that the stoichiometric percentages of K-Flex 188 were replaced with 2-ethylhexanol for the purpose of reducing the system functionality, and hence the crosslink density of the polyurethane composition. The compositions of Examples 106-116 are reported in Table 101 below.

TABLE 101

| Preparative Example | K-Flex 188 | 2-ethyl-hexanol | Dabco T-12 | Desmodur N 3300A | System Functionality | NCO/OH equivalent ratio |
|---|---|---|---|---|---|---|
| 106 | 9.63 | 0 | 0.0368 | 8.0 | 2.51 | 1.05 |
| 107 | 9.15 | 0.26 | 0.0368 | 8.0 | 2.43 | 1.05 |
| 108 | 8.67 | 0.51 | 0.0368 | 8.0 | 2.36 | 1.05 |
| 109 | 8.19 | 0.77 | 0.0368 | 8.0 | 2.30 | 1.05 |
| 110 | 7.71 | 1.03 | 0.0368 | 8.0 | 2.23 | 1.05 |
| 111 | 7.22 | 1.28 | 0.0368 | 8.0 | 2.17 | 1.05 |
| 112 | 6.74 | 1.54 | 0.0368 | 8.0 | 2.12 | 1.05 |
| 113 | 6.26 | 1.8 | 0.0368 | 8.0 | 2.06 | 1.05 |
| 114 | 5.78 | 2.05 | 0.0368 | 8.0 | 2.01 | 1.05 |
| 115 | 5.3 | 2.31 | 0.0368 | 8.0 | 1.97 | 1.05 |
| 116 | 4.82 | 2.57 | 0.0368 | 8.0 | 1.92 | 1.05 |

The films from Preparative Examples 106-116 were then cut into dog bone shaped samples in both the downweb or machine direction (MD, in the direction of coating) and crossweb or cross-direction (CD) orientations and tested according to ASTM D882-02 "Standard Test Method for Tensile Properties of Thin Plastic Sheeting", with a 0.635 centimeter wide dog bone specimen, a crosshead gap setting of 5.1 cm and a crosshead speed of 25.4 centimeters per minute. The MD and CD tensile properties of the films are shown in Table 102 (below), wherein three replicates were tested and averaged for each film with the standard deviation shown in parentheses.

TABLE 102

| Preparative Example | Thickness, micrometers | Peak Tensile Strength, MPa | | Elongation at Break, % | | Young's Modulus, MPa | |
|---|---|---|---|---|---|---|---|
| | | Machine Direction | Crossweb Direction | Machine Direction | Crossweb Direction | Machine Direction | Crossweb Direction |
| 106 | 127 | 33.1 (0.7) | 29.6 (3.4) | 85 (6) | 78 (12) | 490 (18) | 442 (37) |
| 107 | 127 | 31.0 (2.8) | 31.7 (3.4) | 98 (2) | 100 (13) | 327 (46) | 291 (43) |
| 108 | 127 | 28.3 (1.4) | 22.8 (1.4) | 107 (19) | 84 (15) | 128 (148) | 248 (87) |
| 109 | 127 | 24.1 (0.7) | 27.6 (2.1) | 114 (5) | 133 (8) | 93 (106) | 35 (3) |
| 110 | 127 | 22.1 (2.1) | 26.2 (2.8) | 154 (8) | 157 (6) | 30 (3) | 36 (4) |
| 111 | 114 | 21.4 (2.1) | 22.1 (1.4) | 169 (8) | 172 (6) | 34 (3) | 32 (4) |
| 112 | 114 | 14.5 (0.7) | 39.3 (43) | 178 (2) | 137 (78) | 23 (1) | 475 (780) |
| 113 | 114 | 9.6 (0.7) | 10.3 (0.7) | 196 (10) | 201 (4) | 17 (2) | 16 (4) |
| 114 | 114 | 5.5 (0.7) | 5.5 (0.7) | 218 (6) | 222 (2) | 7 (2) | 9 (1) |
| 115 | 114 | 3.4 (0.0) | 4.1 (0.7) | 238 (6) | 240 (8) | 4 (0.3) | 6 (2) |
| 116 | 102 | 1.4 (0.0) | 2.1 (0.0) | 245 (57) | 272 (12) | 6 (1) | 1.5 (0.1) |

The tensile properties of Preparative Examples 106-116 demonstrate that within experimental error there is no significant tensile property difference for any of the samples based on direction, indicating that the films of Preparative Examples 106-116 are mechanically isotropic with respect to length and width.

Preparative Examples 117-126

The procedure of Preparative Example 106 was repeated, except using compositions reported in Table 103 (below), wherein K-Flex 188 was replaced with Urethhall 4050-55, and glycerol was used as a means of increasing the system functionality of the composition, and hence the crosslink density, and Desmodur N 3300A was replaced with Desmodur W.

TABLE 103

| Preparative Example | Urethhall 4050-55 | glycerol | Dabco T-12 | Desmodur W | System Functionality | NCO/OH equivalent ratio |
|---|---|---|---|---|---|---|
| 117 | 14.83 | 0 | 0.0368 | 2 | 2.0 | 1.05 |
| 118 | 13.35 | 0.04 | 0.0368 | 2 | 2.03 | 1.05 |
| 119 | 11.86 | 0.09 | 0.0368 | 2 | 2.07 | 1.05 |
| 120 | 10.38 | 0.13 | 0.0368 | 2 | 2.10 | 1.05 |
| 121 | 13.35 | 0.27 | 0.0368 | 3 | 2.14 | 1.05 |
| 122 | 11.12 | 0.33 | 0.0368 | 3 | 2.17 | 1.05 |
| 123 | 11.86 | 0.54 | 0.0368 | 4 | 2.22 | 1.05 |
| 124 | 11.12 | 0.78 | 0.0368 | 5 | 2.26 | 1.05 |
| 125 | 8.9 | 1.07 | 0.0368 | 6 | 2.3 | 1.05 |
| 126 | 5.19 | 1.41 | 0.0368 | 7 | 2.34 | 1.05 |

The tensile properties of Preparative Examples 117-126 were measured as in Preparative Examples 106-116 hereinabove with the results reported in Table 104 (below), wherein three replicates were tested and averaged for each film with the standard deviation shown in parentheses.

TABLE 104

| Film of Preparative Example | Thickness, micrometers | Peak Tensile Strength, MPa | | Elongation at Break, % | | Young's Modulus, MPa | |
|---|---|---|---|---|---|---|---|
| | | Machine Direction | Crossweb Direction | Machine Direction | Crossweb Direction | Machine Direction | Crossweb Direction |
| 117 | 114 | 13.1 (0.7) | 15.2 (4.9) | 777 (22) | 788 (64) | 7.5 (1.2) | 8.4 (2.0) |
| 118 | 114 | 22.8 (4) | 17.9 (0.7) | 740 (47) | 698 (54) | 12.9 (3.1) | 10.5 (2.9) |
| 119 | 127 | 21.4 (4) | 17.9 (3.4) | 662 (32) | 622 (11) | 14 (3.2) | 11.4 (1.8) |
| 120 | 114 | 22.1 (8) | 15.9 (2.8) | 578 (35) | 549 (37) | 16 (6) | 12.1 (1.5) |
| 121 | 114 | 23.4 (12) | 10.3 (8.3) | 521 (3) | 401 (113) | 17 (8.5) | 8.6 (7.6) |
| 122 | 102 | 25.5 (5.5) | 32.4 (12) | 421 (19) | 454 (49) | 20 (4.4) | 26 (10) |
| 123 | 102 | 38.6 (2.1) | 43.4 (4.1) | 384 (12) | 400 (12) | 32 (7.1) | 35 (3.8) |
| 124 | 102 | 44.8 (2.8) | 33.1 (19) | 298 (10) | 244 (67) | 33 (0.7) | 29 (12) |
| 125 | 102 | 31.7 (8.3) | 22.1 (2.8) | 149 (39) | 96 (25) | 245 (11) | 256 (13) |
| 126 | 102 | 35.8 (14) | 44.1 (2.8) | 7.3 (4.3) | 7.4 (0.4) | 780 (56) | 869 (3.3) |

The tensile properties of Preparative Examples 117-126 demonstrate that within experimental error there is no significant tensile property difference for any of the samples based on direction, indicating that the films of Preparative Examples 112-121 are mechanically isotropic with respect to length and width.

Preparative Example 122

Black Polypropylene Sheet was primed according to the following procedure. The film was air corona treated on both sides with 2.5 kiloWatts of energy and then fed to a gravure roll coater equipped with a 400 lines per inch quad patterned gravure cylinder and coated with a solution of 80% HEA and 20% TMPTA containing 0.01 part per hundred by weight (phr) of Keyplast FL Yellow FPGN at a line speed of 30.5 meters per minute. The web was then exposed to an electron beam source which delivered 5 Megarads of radiation at 175 kiloVolts accelerating voltage at 101 milliAmps of current. During and after exposure, the 2-hydroxyethyl acrylate was chemically grafted and polymerized to the polypropylene film and wound into rolls.

Preparative Example 123

Black Polypropylene Sheet was primed according to the following procedure. The uncoated side of the electron beam primed film from Preparative Example 22 was coated with a solution containing 0.01 phr Uvitex OB, in an 80/20 solution of DMA and TMPTA, using a 400 lines per inch quad patterned gravure cylinder at 30.5 meters per minute and sequentially exposed to 4 Megarads of electron beam radiation at an accelerating voltage of 175 kiloVolts and a current of 81 milliAmps.

Preparative Example 124

A 75 micrometer thick impact modified polypropylene film available as PP7035.E4 from ExxonMobil Corp., Irving, Tex., was primed according to the following procedure. The film was air corona treated on both sides with 2.5 kiloWatts of energy and then fed to a gravure roll coater equipped with a 400 lines per inch quad patterned gravure cylinder and coated with a solution of 80% HEA and 20% TMPTA containing 0.01 phr of Keyplast FL Yellow FPGN at a line speed of 30.5 meters per minute. The web was then exposed to an electron beam source which delivered 5 Megarads of radiation at 175 kiloVolts accelerating voltage at 101 milliAmps of current. During and after exposure, the 2-hydroxyethyl acrylate was chemically grafted and polymerized to the polypropylene film and wound into rolls.

Preparative Example 125

A 75 micrometer thick impact modified polypropylene film available as PP7035.E4 from ExxonMobil Corp., Irving, Tex., was primed according to the following procedure. The uncoated side of the electron beam primed film from Preparative Example 122 was coated with a solution containing 0.01 phr of Uvitex OB in an 80/20 solution of DMA and TMPTA, using a 400 lines per inch quad patterned gravure cylinder at 30.5 meters per minute and sequentially exposed to 4 Megarads of electron beam radiation at an accelerating voltage of 175 kiloVolts and a current of 81 milliAmps.

Example 101

The polyurethane composition of Preparative Example 106 was coated onto the 2-hydroxyethyl acrylate coated surface of the polypropylene sheetstock of Preparative Example 122 by replacing the bottom silicone release liner of Preparative Example 106 with the primed sheet of Preparative Example 122, which resulted in a crosslinked polyurethane coated polypropylene sheet. The sample was allowed to age for at least 24 hours under ambient conditions prior to testing. ASTM D3359-07 "Standard Test Methods for Measuring Adhesion by Tape Test", Test Method B using a six cut lattice pattern, was performed on the sample using Scotch Premium Cellophane Tape 610 available from 3M Company, St. Paul, Minn. The adhesion of the polyurethane coating to the polypropylene sheet resulted in a classification of 5B, meaning 0% of the coating was removed, with 100% intercoat adhesion.

Example 102

The crosslinked polyurethane-coated polypropylene sheet of Example 101 was thermoformed using a pressure/vacuum thermoformer (Model 2024, produced by Labform Hydro-Trim Corporation, W. Nyack, N.Y.). An aluminum step mold was used to evaluate the thermoformable sheet's ability to conform to various geometric constraints. The mold, which had a width of 88 mm, had a cross-sectional surface profile from left to right as follows: 12 mm height for 14 mm horizontal (Area A), 3 mm height for 12 mm horizontal (Area B), 12 mm height for 19 mm horizontal (Area C), 6 mm height for 25 mm horizontal (Area D), 12 mm height for 19 mm horizontal (Area E), 25 mm height for 12 mm horizontal (Area F), 12 mm height for 19 mm horizontal (Area G), 25 mm height for 25 mm horizontal (Area H), and 16 mm height for 14 mm horizontal (Area I). The thermoforming conditions used consisted of exposing the sample to 400° F. (200° C.) top and bottom oven temperatures for 30 seconds with an 8 second forming time. The top pressure was 6.55 bar (655 kPa) and the bottom vacuum was 659 torr (87.9 kPa).

Area H was used to measure gloss after thermoforming. Preparative Example 124 exhibited a 0.71-cm radius of curvature at all inside corners and cracking of the polyurethane coating was noted on vertical surfaces adjacent to Areas D-I. The 60 degree gloss of the thermoformed surface was 85.6 gloss units as measured by a Gloss Meter manufactured by BYK-Gardner, Columbia, Md.

Examples 103-112

The coating compositions of Preparative Examples 107-117 were coated according to the procedure of Example 101 and thermoformed. Table 105 below reports the observed results of thermoforming.

TABLE 105

| Example | Corresponding Preparative Example | 60 degree Gloss in Area H | Areas Adjacent Which Vertical Regions Cracked | Measured radius of curvature, cm |
|---|---|---|---|---|
| 103 | 107 | 85.5 | EFGHI | 0.71 |
| 104 | 108 | 84.6 | DEFGHI | 0.71 |
| 105 | 109 | 83.7 | DEFGHI | 0.71 |
| 106 | 110 | 85 | DEFGHI | 0.71 |
| 107 | 111 | 81.5 | DEFGHI | 0.71 |
| 108 | 112 | 76.4 | FGH | 0.71 |

TABLE 105-continued

| Example | Corresponding Preparative Example | 60 degree Gloss in Area H | Areas Adjacent Which Vertical Regions Cracked | Measured radius of curvature, cm |
|---|---|---|---|---|
| 109 | 113 | 82.7 | FGH | 0.71 |
| 110 | 114 | 79.4 | FGH | 0.71 |
| 111 | 115 | 78.1 | CDFGH | 0.71 |
| 112 | 116 | 71 | GH | 0.56 |

Examples 113-122

The coating compositions of Preparative Examples 106-116 were coated according to the procedure of Example 101 and thermoformed. Table 106 below reports the observed results of thermoforming.

TABLE 106

| Example | Corresponding Preparative Example | 60 degree Gloss in Area H | Areas Adjacent Which Vertical Regions Cracked | Measured radius of curvature, cm |
|---|---|---|---|---|
| 113 | 16 | 79.4 | GH | 0.635 |
| 114 | 39 | 79.1 | GH | 0.610 |
| 115 | 40 | 79.5 | GH | 0.622 |
| 116 | 41 | 79.6 | FGH | 0.648 |
| 117 | 42 | 81.5 | FGH | 0.635 |
| 118 | 43 | 81.1 | DEFGHI | 0.660 |
| 119 | 44 | 79.9 | DEFGHI | 0.660 |
| 120 | 45 | 82.5 | DEFGHI | 0.660 |
| 121 | 46 | 83.3 | DEFGHI | 0.660 |
| 122 | 47 | 74.4 | FGH | 0.635 |

Example 123

Samples of the crosslinked polyurethane coated polypropylene sheet of Example 101 were prepared with increasing thicknesses of the polyurethane coating composition of Preparative Example 106. Each sample was evaluated for scratch resistance according to DaimlerChrysler specification LP-463DD-18-01 using a scratch and mar tester supplied by Taber Industries, Tonawanda, N.Y. The scratch resistance was determined by individual probes containing different weights that correspond to 5 Newtons, 7 Newtons, 10 Newtons, 15 Newtons, and 20 Newtons of force. The results are determined by specifying it on a scale of 1.0 to 5.0: 1.0=no scratch; 2.0=very slight scratch; 3.0=slight scratch; 4.0=moderate scratch; 5.0=severe scratch. An example of the polypropylene sheet with no polyurethane coating was tested as a comparative example. The scratch test results are shown in Table 7 below.

TABLE 107

| Coating thickness, micrometers | 5 Newtons | 7 Newtons | 10 Newtons | 15 Newtons | 20 Newtons |
|---|---|---|---|---|---|
| | Immediately after Scratch and Mar Test | | | | |
| 51 | 2.0 | 2.0 | 3.0 | 3.0 | 5.0 |
| 102 | 1.0 | 2.0 | 3.0 | 3.0 | 5.0 |
| 254 | 1.0 | 1.0 | 1.0 | 2.0 | 3.0 |
| 381 | 1.0 | 1.0 | 1.0 | 1.0 | 2.0 |
| 508 | 1.0 | 1.0 | 1.0 | 1.0 | 1.5 |

TABLE 107-continued

| Coating thickness, micrometers | 5 Newtons | 7 Newtons | 10 Newtons | 15 Newtons | 20 Newtons |
|---|---|---|---|---|---|
| uncoated Black Polypropylene Sheet | 2.0 | 3.0 | 3.0 | 5.0 | 5.0 |
| 3 Months after Scratch and Mar Test | | | | | |
| 51 | 1.5 | 2.0 | 3.0 | 3.0 | 5.0 |
| 102 | 1.0 | 1.5 | 1.5 | 2.0 | 4.0 |
| 254 | 1.0 | 1.0 | 1.0 | 1.5 | 2.0 |
| 381 | 1.0 | 1.0 | 1.0 | 1.0 | 1.5 |
| 508 | 1.0 | 1.0 | 1.0 | 1.0 | 1.0 |
| uncoated Black Polypropylene Sheet | 2.0 | 3.0 | 3.0 | 5.0 | 5.0 |

The polyurethane film samples from Preparative Examples 106-126 were tested using a Differential Scanning calorimeter Model Q100 manufactured by TA Instruments, Newcastle, Del., to determine the glass transition temperature ($T_g$) in degrees Celsius of each film composition. The results are reported in Table 108 (below).

TABLE 108

| Film of Preparative Example | $T_g$, °C. |
|---|---|
| 106 | 32.60 |
| 107 | 26.75 |
| 108 | 30.33 |
| 109 | 24.13 |
| 110 | 17.74 |
| 111 | 15.01 |
| 112 | 13.3 |
| 113 | 10.64 |
| 114 | 6.94 |
| 115 | 4.34 |
| 116 | 1.48 |
| 117 | −47.05 |
| 118 | −46.48 |
| 119 | −46.08 |
| 120 | −46.33 |
| 121 | −46.44 |
| 122 | −46.28 |
| 123 | −46.53 |
| 124 | −47.81 |
| 125 | −49.44 |
| 126 | not measured |

Example 124

A 29 micrometers thick multilayer optical film available from 3M Company was used as the bottom film to apply a polyurethane coating as in Preparative Example 106 with a gap setting of 76.2 micrometers. The coated optical film was then thermoformed as in Example 102, except using a cell phone as the mold.

Example 125

A 254 micrometers thick sheet of uncoated polycarbonate was substituted for the bottom liner to apply a polyurethane coating as in Preparative Example 106 with a gap setting of 50.8 micrometers. The coated polycarbonate was allowed to polymerize for at least 24 hours and thermoformed using the conditions of Example 102.

Example 126

A two-part epoxy composition (available as 3M Scotch-Weld Epoxy Adhesive DP105 Clear from 3M Company) was coated as in Preparative Example 106, except that a gap setting of 76.2 micrometers was used.

Example 127

A two-part silicone rubber compound (available as RTV664 from GE Silicones Waterford, N.Y.) was prepared by mixing ten parts by weight of Part A with one part by weight of Part B using a Flacktek Speedmixer DAC 150 FV as in Preparative Example 106. The mixture was then coated as in the procedure of Preparative Example 106 and the sample allowed to cure for 24 hours. The result was a highly flexible silicone film.

Example 128

A sample was prepared by adding 1.0 gram of Orange 11Y692 to the resin mixture of Preparative Example 119 and then coated onto a primed polypropylene sheet as in Example 101. The sample was aged at room temperature for at least 24 hours and then thermoformed as in Example 102. No cracking was observed in any areas of the polyurethane coating.

Series 200 Examples

Film Coating Procedure 200

Polyurethane films were prepared using the coating apparatus as generally shown in FIG. 5 and the procedure described above in Preparative Example 106. The notched bar was heated using fluid heated at 120° F. (49° C.) circulated through the notched bar. Twelve-inch (30-cm) wide forming webs were used as both the top and bottom liners. The films were coated at a line speed of 5 feet per minute (1.5 m/min) The heated platen 565 had 5 zones, each 4 feet (1.2 m) long. The temperature of the first 4 zones was set to 180° F. (82.2° C.) while the last zone was at room temperature. The unwind tension for the top and bottom liners, and the rewind tension for the resultant coated film were all set to 20 lbs (89 N). The gap between the two liners at the nip formed by the notched bar and the flatbed was set to 4 mils (0.1 mm) After the film was coated and wound into a roll, it was conditioned at room temperature for at least 3 days prior to evaluation.

Film Preparation for Testing Procedure

For the determination of metal bending evaluation and Erichsenk scratch resistance, films of about 100 micrometer thickness were made according to Film Coating Procedure 200 with polyester film used as both the top and bottom liners.

For testing tensile and elongation properties, both liners were removed and 2.54 cm wide samples were prepared.

For metal bending, environmental cycling, accelerated weathering, and Erichsen scratch resistance tests, one of the liners was removed and the exposed side of the film was laminated to RD 2788 adhesive between two rolls with a nip pressure of 30 psi (130 N). The laminated samples were conditioned for one day before laminating the adhesive side to an unpainted sheet metal panel for metal bending and scratch resistance evaluation. The lamination of the film to the unpainted sheet metal was done between two rolls with a nip pressure of 30 psi (130 N). The laminate was conditioned at room temperature for one day and the top liner was removed before carrying out further tests.
Thermoforming Test Thermoforming tests were done using a thermoformer available as a Hydro-trim Thermoformer, Labform Model 2024, from Hydro-trim Corporation of W. Nyack, N.Y. A 12 inches×12 inches (30 cm×30 cm) sheet was used in all the thermoforming experiments. The sheet to be thermoformed was softened by radiant heating panels above and below the sheet to provide controlled and uniform heating. The top and bottom radiant panels were set at 400° F. (204° C.). The softened plastic sheet was then formed using a combination of pressure forming and vacuum forming A vacuum of 25 in of Hg (85 kPa) and a forming pressure of 80 psi (0.56 MPa) were used in the forming operation. A heating time of 30 seconds and a forming time of 8 seconds were used in all the thermoforming experiments described.

The polyurethane composition to be tested was coated onto the grafted side of a polypropylene sheet made according to Preparative Example 122 using Film Coating Procedure 200. The polypropylene sheet was used as the bottom liner and a polyester film was used as the top liner. The film was always coated on the side with the 2-hydroxyethyl acrylate coating. After conditioning the coated roll for at least 3 days, it was cut into 12 inches×12 inches (30 cm×30 cm) sheets for thermoforming tests.

Three different molds were used in the thermoforming tests of the different samples:
1. Dome-shaped mold—The inner diameter of the base of the dome was 3.5 inches (8.9 cm) and the height of the dome was 2.25 inches (5.8 cm). A sample was rated as "pass" if there was no cracking on the surface of the thermoformed dome and it was rated as "fail" if there was cracking on the surface of the thermoformed dome.
2. Rectangular step mold—The dimensions of the rectangular step were 5.25 inches (13.3 cm)×3 inches (8 cm) by 0.75 inch (1.9 cm, height). The edges of the step were vertical. A sample was rated as "pass" if there was no cracking on the edge walls of the thermoformed rectangular step and it was rated as "fail" if there was cracking on the edge wall of the thermoformed rectangular step.
3. Circular depth mold—The mold had a circular trough in a rectangular block 5.25 inches (13.3 cm)×3 inches (8 cm) by 0.75 inch (1.9 cm, height). The diameter of the circle was 19 mm and it was 2 mm deep. A sample was rated as "pass" if there was no cracking in the sample that was thermoformed into the circular trough and it was rated as "fail" if there was cracking in the sample that was thermoformed into the circular trough.

Tensile and Elongation Properties Test

Tensile and elongation testing was performed on coated liner composite films after removing the top and bottom liners and was measured with a force measurement device available as MTS Renew Upgrade Instron, model 1122, from MTS Systems Corp., Eden Prairie, Minn., equipped with a 200 lb (890 N) load cell. The jaw gap between the crossheads was fixed at 4 inches (10 cm) and a crosshead speed of 20 in/min (50 cm/min) was used. Film samples of one inch (1.3 cm) width were used in the tensile and elongation tests.
Metal Bending Test Metal bending evaluation was done on film laminated to metal. Cold rolled steel panels used for the metal bending test were obtained from ACT Laboratories, Hillsdale, Mich., as 4-inch×12-inch (10-cm×30-cm) panels with a thickness of 32 mils (0.81 mm) The steel had a primer (ED5100) e-coated on both sides. The steel panels were cut into 4-inch×1-inch (10-cm×1.3-cm) steel coupons for the metal bending test. The film/metal laminate was bent with a metal bender to form a shape that had an internal bending angle of 45 degrees and an internal bending radius of 0.031 inch (0.79 mm) The film was observed after one day for any crack formation. A film sample was rated as "pass" if there was no tear in the film (near the bend) through which the metal substrate underneath was visible. A film sample was rated as "fail" if there was even a slight visible tear in the film near the bend.
Environmental Cycling Test The environmental cycling test was done on a film/metal laminate. The laminate was bent with a metal bender as described in the metal bending test above and the bent samples were aged in the environmental chamber for 1008 hrs. Each cycle in the environmental chamber had the following conditions and the cycles were repeated over a 1008 hour period.

Conditions during each cycle in the environmental chamber were:
17 hours at −30° C.,
72 hours at 80° C.,
24 hours at 38° C. and 100% relative humidity,
7 hours at −30° C.,
17 hours at 38° C. and 100% relative humidity,
7 hours at 80° C.,
24 hours at 38° C. and 100% relative humidity.
A film sample was rated as "pass" if there was no evidence of cracking, loss of adhesion or other mode of failure after 1008 hours in the environmental chamber.

Equations for terms used in Tables 202, 205, 206, and 207 are given below, wherein "wt %" means percent by weight based on the total weight of resin.

$$\text{Crosslink Density(wt \%)}=(\text{weight of short chain polyol}+\text{weight of polyisocyanate})/\text{total weight of resin}$$

wherein:
short chain polyols have an equivalent weight≤185 g/eq and a functionality>2; and
polyisocyanates have functionality>2.

$$\text{Wt \% of 1,4-Butanediol}=(\text{weight of 1,4-butanediol})/\text{total weight of resin}$$

$$\text{Wt \% of Caprolactonetriol}=(\text{weight of caprolactone triol})/\text{total weight of resin}$$

$$\text{Wt \% of High Molecular Weight Polyol}=(\text{Weight of high molecular weight polyol})/\text{total weight of resin}$$

wherein high molecular weight polyols have an equivalent weight>850 g/eq and a functionality≥2

$$\text{Wt \% of Low Molecular Weight Polyol}=(\text{Weight of low molecular weight polyol})/\text{total weight of resin}$$

wherein low molecular weight polyols have an equivalent weight≤850 g/eq, but >185 g/eq and a functionality≥2
Two-Part Urethane Formulations 201 to 205

Table 202 (below) shows Formulations 201 through 205 that were combined as Part A and Part B.

TABLE 202

| | | | Formulation, parts | | | | |
| | Charge | Material | 201 | 202 | 203 | 204 | 205 |
| --- | --- | --- | --- | --- | --- | --- | --- |
| Part A | 1 | Fomrez 55-112 | 50.3 | 57.3 | 62.3 | 17.8 | 17.8 |
| | 2 | Fomrez 55-225 | 0 | 0 | 0 | 7 | 36 |
| | 3 | Capa 3031 | 0 | 0 | 0 | 31 | 31 |

TABLE 202-continued

|  | Charge | Material | Formulation, parts | | | | |
|---|---|---|---|---|---|---|---|
|  |  |  | 201 | 202 | 203 | 204 | 205 |
|  | 4 | 1,4-butanediol | 23.5 | 16.5 | 11.5 | 0 | 0 |
|  | 5 | Tinuvin 292 | 3 | 3 | 3 | 6 | 6 |
|  | 6 | Tinuvin 405 | 3 | 3 | 3 | 6 | 6 |
|  | 7 | Tinuvin 328 | 0 | 0 | 0 | 3 | 3 |
|  | 8 | Dabco T-12 | 0.2 | 0.2 | 0.2 | 0.2 | 0.2 |
|  | 9 | 34B662 Black Pigment Dispersion | 20 | 20 | 20 | 29 | 0 |
| Part B | 10 | Desmodur W | 95 | 82 | 68 | 0 | 0 |
|  | 11 | Fomrez 55-112 | 5 | 18 | 32 | 0 | 0 |
|  | 12 | Desmodur N 3300 A | 0 | 0 | 0 | 100 | 100 |
| Hard Segment, wt % |  |  | 59.3 | 49.3 | 39.8 | 65.5 | 66.5 |

Preparation of Clear Coat 201

A solvent blend was prepared in a glass jar by adding 6.42 grams of methyl isobutyl ketone, 6.38 grams of n-butyl acetate, 37.6 grams of xylene, and 14.8 grams of propylene glycol methyl ether acetate. While the solvent blend was being agitated, 2 grams of cellulose acetate butyrate-381-0.1, 17.57 grams of Joncryl-578, 8.66 grams of Capa 2054, 1.33 grams of Tinuvin 292, 5.24 grams of Cosorb MOH, and 0.0024 grams of Metacure T-12 were added. The mixture was agitated for 20 minutes until it was homogeneous. Desmodur N 3390 (17 grams) was added into 100 grams of the solution mixture and the combined ingredients were then stirred for 10 minutes. The solution was coated on a melamine-acrylic coated releasable polyester carrier web at about 1 mil (0.03 mm) wet thickness to obtain a 0.4 mil (0.001 mm) dry thickness. The coating was dried and partially cured for 30 seconds at 150° F. (66° C.), 30 seconds at 225° F. (107° C.) and 30 seconds at 265° F. (129° C.).

Bayhydrol 122 (100 grams) was placed into a glass jar along with 0.2 grams of AMP 95, 1.6 grams of Cosorb OSG, 1.3 grams of Tinuvin 292, 8.0 grams of butyl carbitol, and 0.2 grams of Triton GR-7M. De-ionized water was added into the solution mixture to control the solution viscosity to between 100 centipoise (100 mPa-sec) and 200 centipoise (200 mPa-sec). Prior to coating, 3.0 grams of Neocryl CX-100 was added into 100 grams of the prepared solution mixture. The water-based solution was agitated for 10 minutes and was then coated onto the above partially cured solvent-based coating at a 50 micrometer wet thickness to obtain a 13 micrometer dry thickness. The coating was dried and cured for 30 seconds at 175° F. (79° C.), 30 seconds at 245° F. (118° C.) and 30 seconds at 285° F. (141° C.).

Preparation of Clear Coat 202

Alberdingk U 933 (83.78 grams) was placed into a glass jar along with 8.47 grams of butyl carbitol, 0.3 grams of Triton GR-7M, 0.03 grams of AMP 95, 1.08 grams of Cosorb OSG, and 0.45 grams of Tinuvin 123 and agitated for 10 minutes. The solution mixture was diluted with de-ionized water and its viscosity was kept to between 50 centipoise (50 mPa-sec) and 120 centipoise (120 mPa-sec). Neocryl CX-100 (1.78 grams) was added to 100 grams of the coating mixture solution prior to coating. The solution was coated at a 50-micrometer wet thickness on a standard polyester carrier web to obtain about a 13 micrometer dry thickness. The coating was dried and cured for 30 seconds at 175° F. (79° C.), 30 seconds at 245° F. (118° C.) and 30 seconds at 285° F. (141° C.).

Preparation of Clear Coat 203

Clear Coat 203 was prepared by mixing Part A and Part B of Formulation 205 (shown in Table 202) at a 1:1 ratio of Part A to Part B using an in-line static mixer, and coated according to Film Coating Procedure 200 above. The coating (38 micrometer thickness) was sandwiched between two T10 Release Liners, resulting in a partially cured transparent film. One of the liners was removed leaving an exposed polyurethane transparent layer.

Example 201

Part A of Formulation 201 was made using the following procedure. Charges 1 to 4 were added into a glass jar and agitated. The mixture was then heated to 100° C. Charges 5 to 8 were then added while the temperature was still at about 100° C., and then agitated thoroughly to make sure all the ingredients were well dissolved in the mixture. After all the ingredients were dissolved, charge 9 was added into the mixture and agitated for about 10 minutes to make sure the mixture was uniformly mixed. The resultant black resin mixture was vacuum-degassed at 60° C. for at least 12 hours.

Part B of Formulation 201 was prepared by mixing charges 10 to 12, and agitating the mixture for 1 hour at 70° C.

Part A was mixed with the Part B in a 1:1 ratio using an in-line static mixer, and coated at a thickness of 100 micrometers between the Clear Coat 201 and Black Polypropylene Sheet according to Film Coating Procedure 200 above.

The resulting opaque color layer/transparent clear layer multilayer article was prepared for testing according to the Film Preparation for Testing Procedure described above.

Example 202

Example 201 was repeated, except that Clear Coat 202 was used instead of Clear Coat 201. The resultant opaque multilayer article was prepared for testing according to the Film Preparation for Testing procedure and tested according to the Thermoforming Test. Results are reported in Table 203. The samples that were thermoformed with dome-shaped mold were subjected to environmental cycling test. The environmental cycling test results are reported in Table 204.

Example 203

Example 201 was repeated, except that Clear Coat 201 was replaced with T10 Release Liner. The resulting opaque multilayer article was prepared for testing according to the Film Preparation for Testing procedure and tested according to the Thermoforming Test. Results are reported in Table 203.

Example 204

Example 201 was repeated, except that the Black Polypropylene Sheet was replaced by a T10 Release Liner. The resulting opaque multilayer article was prepared for testing according to the Film Preparation for Testing procedure and tested according to the Tensile Elongation Test. Results are reported in Table 203.

Example 205

Example 201 was repeated, except that the Black Polypropylene Sheet was replaced by a T10 Release Liner, and Clear Coat 202 was used instead of Clear Coat 201. The resultant opaque multilayer article was evaluated by the Tensile Elongation Test procedure. Results are reported in Table 203.

Example 206

Example 201 was repeated, except that Part A and Part B of Formulation 202 were used instead of those of Formulation 201. The resultant opaque multilayer article was prepared for testing according to the Film Preparation for Testing procedure and tested according to the Thermoforming Test. Results are reported in Table 203. The samples that were thermoformed with dome-shaped mold were subjected to environmental cycling test. The environmental cycling test results are reported in Table 204.

Example 207

Example 206 was repeated, except that Clear Coat 201 was replaced by Clear Coat 202. The resultant opaque multilayer article was prepared for testing according to the Film Preparation for Testing procedure and tested according to the Thermoforming Test. Results are reported in Table 203. The samples that were thermoformed with dome-shaped mold were subjected to environmental cycling test. The environmental cycling test results are reported in Table 204.

Example 208

Example 206 was repeated, except that no Clear Coat 201 was present. The resultant opaque multilayer article was prepared for testing according to the Film Preparation for Testing procedure and tested according to the Thermoforming Test. Results are reported in Table 203.

Example 209

Example 206 was repeated except that Black Polypropylene Sheet was replaced by a T10 Release Liner. The resultant opaque multilayer article was prepared for testing according to the Film Preparation for Testing procedure and tested according to the Tensile Elongation Test. Results are reported in Table 203.

Example 210

Example 206 was repeated, except that Black Polypropylene Sheet was replaced by a T10 Release Liner, and Clear Coat 202 was used in place of Clear Coat 201. The resultant opaque multilayer article was prepared for testing according to the Film Preparation for Testing procedure and tested according to the Tensile Elongation Test. Results are reported in Table 203.

Example 211

Example 201 was repeated, except that Part A and Part B of Formulation 203 were used instead of those of Formulation 201. The resultant opaque multilayer article was prepared for testing according to the Film Preparation for Testing procedure and tested according to the Thermoforming Test. Results are reported in Table 203. The samples that were thermoformed with dome-shaped mold were subjected to environmental cycling test. The environmental cycling test results are reported in Table 204.

Example 212

Example 211 was repeated, except that Clear Coat 201 was replaced by Clear Coat 202. The resultant opaque multilayer article was prepared for testing according to the Film Preparation for Testing procedure and tested according to the Thermoforming Test. Results are reported in Table 203. The samples that were thermoformed with dome-shaped mold were subjected to environmental cycling test. The environmental cycling test results are reported in Table 204.

Example 213

Example 211 was repeated, except that no Clear Coat 201 was present. The resultant opaque multilayer article was prepared for testing according to the Film Preparation for Testing procedure and tested according to the Thermoforming Test. Results are reported in Table 203.

Example 214

Example 211 was repeated, except that Black Polypropylene Sheet was replaced by a T10 Release Liner. The resultant opaque multilayer article was prepared for testing according to the Film Preparation for Testing procedure and tested according to the Tensile Elongation Test. Results are reported in Table 203.

Example 215

Example 211 was repeated, except that Black Polypropylene Sheet was replaced by a T10 Release Liner, and Clear Coat 202 was used in place of Clear Coat 201. The resultant opaque multilayer article was prepared for testing according to the Film Preparation for Testing procedure and tested according to the Tensile Elongation Test. Results are reported in Table 203.

Example 216

Example 201 was repeated, except that Part A and Part B of Formulation 204 were used instead of those of Formulation 201. The resultant opaque multilayer article was prepared for testing according to the Film Preparation for Testing procedure and tested according to the Thermoforming Test. Results are reported in Table 203.

Example 217

Example 216 was repeated, except that Clear Coat 201 was replaced by Clear Coat 202. The resultant opaque multilayer article was prepared for testing according to the Film Preparation for Testing procedure and tested according to the Thermoforming Test. Results are reported in Table 203.

Example 218

Example 216 was repeated, except that no Clear Coat 201 was present. The resultant opaque multilayer article was prepared for testing according to the Film Preparation for Testing procedure and tested according to the Thermoforming Test. Results are reported in Table 203.

Example 219

Example 216 was repeated except that the Black Polypropylene Sheet was replaced by a T10 Release Liner. The resultant opaque multilayer article was prepared for testing according to the Film Preparation for Testing procedure and tested according to the Tensile Elongation Test. Results are reported in Table 203.

Example 220

Example 211 was repeated, except that the Black Polypropylene Sheet was replaced by a T10 Release Liner, and Clear Coat 202 was used in place of Clear Coat 201. The resultant opaque multilayer article was prepared for testing according to the Film Preparation for Testing procedure and tested according to the Tensile Elongation Test. Results are reported in Table 203.

Preparative Example 201

Example 201 was repeated, except that Part A and Part B of Formulation 201 were mixed and coated between two T10 Release Liners. The resultant opaque polyurethane film was prepared for testing according to the Film Preparation for Testing procedure, and tested according to the Tensile Elongation Test. Results are reported in Table 203.

Preparative Example 202

Preparative Example 201 was repeated, except that Part A and Part B of Formulation 201 were replaced by those of Formulation 202. The resultant opaque polyurethane film was prepared for testing according to the Film Preparation for Testing procedure, and tested according to the Tensile Elongation Test. Results are reported in Table 203.

Preparative Example 203

Preparative Example 201 was repeated, except that Part A and Part B of Formulation 201 were replaced by those of Formulation 203. The resultant opaque polyurethane film was prepared for testing according to the Film Preparation for Testing procedure, and tested according to the Tensile Elongation Test. Results are reported in Table 203.

Preparative Example 204

Preparative Example 201 was repeated, except that Part A and Part B of Formulation 201 were replaced by those of Formulation 204. The resultant opaque polyurethane film was prepared for testing according to the Film Preparation for Testing procedure, and tested according to the Tensile Elongation Test. Results are reported in Table 203.

Example 221

Example 201 was repeated, except that Clear Coat 203 was used in place of Clear Coat 201, and Part A and Part B of Formulation 204 were used in place of Formulation 201, and the Black Polypropylene Sheet was replaced by a T10 Release Liner. The resultant opaque multilayer film was prepared for testing according to the Film Preparation for Testing procedure, and tested according to the Tensile Elongation Test. Results are reported in Table 203.

Example 222

Example 221 was repeated, except that Part A and Part B of Formulation 202 were used instead of those of Formulation 204. The resultant opaque polyurethane film was prepared for testing according to the Film Preparation for Testing procedure, and tested according to the Tensile Elongation Test. Results are reported in Table 203.

Example 223

Example 221 was repeated, except that after removal of the liner adjacent the opaque black polyurethane film the exposed film layer was laminated to RD 2788 at 6 feet per minute (1.8 m/min) and a pressure of 30 psi (1.4 kPa). The release liner on the RD 2788 was peeled away and the adhesive side was laminated to Black Polypropylene Sheet at 30 feet per minute (9.1 m/min) and at a pressure of 30 psi (1.4 kPa). The resultant opaque multilayer article was prepared for testing according to the Film Preparation for Testing procedure and tested according to the Thermoforming Test. Results are reported in Table 203.

Example 224

Example 221 was repeated, except that after removal of the liner adjacent the opaque black polyurethane film the exposed film layer was laminated to RD 2788 at 6 feet per minute (1.8 m/min) and a pressure of 30 psi (1.4 kPa). The release liner on the RD 2788 was peeled away and the adhesive side was laminated to Black Polypropylene Sheet at 30 feet per minute (9.1 m/min) and at a pressure of 30 psi (1.4 kPa). The resultant opaque multilayer article was prepared for testing according to the Film Preparation for Testing procedure and tested according to the Thermoforming Test. Results are reported in Table 203.

In Table 203 (below), "NM" means not measured.

TABLE 203

| Example | Percent Elongation at Break | Thermoforming Test Circular Depth Mold | Rectangular Step Mold | Dome Mold |
|---|---|---|---|---|
| 201 | NM | pass | pass | pass |
| 202 | NM | pass | pass | pass |
| 203 | NM | pass | pass | pass |
| 204 | very brittle | NM | NM | NM |
| 205 | very brittle | NM | NM | NM |
| 206 | NM | pass | pass | pass |
| 207 | NM | pass | pass | pass |
| 208 | NM | pass | pass | pass |
| 209 | 213 | NM | NM | NM |
| 210 | 303 | NM | NM | NM |
| 211 | NM | pass | pass | pass |
| 212 | NM | pass | pass | pass |
| 213 | NM | pass | pass | pass |
| 214 | 188 | NM | NM | NM |
| 215 | 323 | NM | NM | NM |
| 216 | NM | pass | fail | fail |
| 217 | NM | pass | fail | fail |
| 218 | NM | pass | fail | fail |
| 219 | 167 | NM | NM | NM |
| 220 | 153 | NM | NM | NM |
| Preparative Ex. 201 | very brittle | NM | NM | NM |
| Preparative Ex. 202 | 341 | NM | NM | NM |
| Preparative Ex. 203 | 829 | NM | NM | NM |
| Preparative Ex. 204 | 85 | NM | NM | NM |
| 221 | 199 | NM | NM | NM |
| 222 | 198 | NM | NM | NM |
| 223 | NM | pass | fail | fail |
| 224 | NM | pass | fail | fail |

TABLE 204

| Example | Environmental Cycling Test |
|---|---|
| 201 | pass |
| 202 | pass |
| 206 | pass |
| 207 | pass |
| 211 | pass |
| 212 | pass |

Example 225

The ingredients of Part A listed for Example 225 in Table 205, were placed (with agitation), into a glass jar. The mixture was degassed under vacuum at 60° C. for 12 hours. Part A was mixed with Part B listed for Example 225 in Table 205 and coated between two T10 Release Liners at a thickness of 100 micrometers, and also coated between a T10 release Liner as top liner and Black Polypropylene Sheet as the bottom liner at a 100 micrometer thickness. The coated polyurethane film was cured as described in Example 201. The resulting opaque polyurethane film (between liners) was prepared for testing according to the Film Preparation for Testing procedure, and tested according to the Tensile Elongation Test and/or Thermoforming Test with the results shown in Table 205 below.

Examples 226-235

Examples 226-235 were prepared as in Example 225, except that the compositions of Part A and Part B were varied as shown in Tables 205, 206, and 207.

The resulting opaque polyurethane film (between liners) was prepared for testing according to the Film Preparation for Testing procedure, and tested according to the Tensile Elongation Test and/or Thermoforming Test with the results shown in Tables 205-207 below.

TABLE 205

| | Example 225 | Example 226 | Example 227 | Example 228 |
|---|---|---|---|---|
| Part A | | | | |
| 1,4-butanediol | 0 | 9 g | 16 g | 22.5 g |
| Fomrez 55-225 | 99.85 g | 90.85 g | 83.85 g | 58.5 g |
| Dabco T-12 | 0.15 g | 0.15 g | 0.15 g | 0.1 g |
| Part B | | | | |
| Desmodur W | 54.5 g | 76.7 g | 94.1 g | 100 g |
| Curing Ratio A/B | 100/54.5 | 100/76.7 | 100/94.1 | 81.1/100 |
| Crosslink Density, Wt % | 0 | 0 | 0 | 0 |
| Wt % 1,4-butanediol | 0 | 5.10 | 8.24 | 12.40 |
| Wt % caprolactonetriol | 0 | 0 | 0 | 0 |
| Wt % high MW Polyol | 0 | 0 | 0 | 0 |
| Wt % of low MW Polyol | 64.6 | 51.4 | 43.2 | 32.3 |
| Hard Segment Wt % | 35.3 | 48.5 | 56.7 | 67.6 |
| Percent Elongation at Break | 32 | 235 | 151 | 66 |
| Rectangular Step Mold | pass | pass | pass | fail |

TABLE 206

| | Example 227 | Example 228 | Example 229 | Example 230 | Example 231 | Example 232 |
|---|---|---|---|---|---|---|
| Part A | | | | | | |
| 1,4-butanediol | 16 g | 22.5 g | 0 | 0 | 22.5 g | 16 g |
| Fomrez 55-225 | 83.85 g | 58.5 g | 79.9 g | 0 | 0 | 0 |
| Fomrez 55-112 | 0 | 0 | 0 | 79.85 g | 58.45 g | 83.85 g |
| Capa 3031 | 0 | 0 | 20 g | 20 g | 0 | 0 |
| Dabco T-12 | 0.15 g | 0.1 g | 0.1 g | 0.15 g | 0.15 g | 0.15 g |
| Part B | | | | | | |
| Desmodur W | 94.1 g | 100 g | 70.8 g | 49.1 g | 84.1 g | 71.4 g |
| Curing Ratio A/B | 100/94.1 | 81.1/100 | 100/70.8 | 100/49.1 | 81.1/84.1 | 100/71.4 |
| Crosslink Density, Wt % | 0 | 0 | 11.71 | 13.41 | 0 | 0 |
| Wt % 1,4-butanediol | 8.24 | 12.40 | 0 | 0 | 13.60 | 9.33 |
| Wt % caprolactone triol | 0 | 0 | 11.71 | 13.41 | 0 | 0 |
| Wt % high MW Polyol | 0 | 0 | 0 | 53.55 | 35.40 | 48.90 |
| Wt % of low MW Polyol | 43.20 | 32.30 | 46.78 | 0 | 0 | 0 |
| Hard Segment Wt % | 56.70 | 67.60 | 53.20 | 46.34 | 64.50 | 51.00 |
| Percent Elongation at Break | 151 | 66 | 73 | 236 | 72 | 142 |
| Thermoforming Test, Rectangular Step mold | pass | fail | fail | pass | pass | pass |

TABLE 207

| | Example 230 | Example 233 | Example 234 | Example 235 |
|---|---|---|---|---|
| Part A | | | | |
| FOMREZ 55-112 | 79.85 g | 94.85 g | 63.85 g | 49.9 g |
| CAPA 3031 | 20 g | 5 g | 36 g | 50 gm |
| DABCO T-12 | 0.15 g | 0.15 g | 0.15 g | 0.1 g |
| Total | 100 g | 100 g | 100 g | 100 g |
| Part B | | | | |
| DESMODUR W | 49.1 g | 32.7 g | 66.5 g | 81.7 g |
| Curing Ratio A/B | 100/49.1 | 100/32.7 | 100/66.5 | 100/81.7 |
| Crosslink Density, Wt % | 13.41 | 3.77 | 21.62 | 27.50 |
| Wt % 1,4-butanediol | 0 | 0 | 0 | 0 |

TABLE 207-continued

|  | Example 230 | Example 233 | Example 234 | Example 235 |
|---|---|---|---|---|
| Wt % caprolactone triol | 13.41 | 3.77 | 21.62 | 27.50 |
| Wt % high MW Polyol | 53.55 | 71.47 | 38.35 | 27.46 |
| Wt % of low MW Polyol | 0 | 0 | 0 | 0 |
| Hard Segment Wt % | 46.34 | 28.40 | 61.56 | 72.50 |
| Percent Elongation at Break | 236 | 402 | 10 | 104 |
| Thermoforming Test, Rectangular Step Mold | pass | pass | pass | fail |

Series 300 Examples

Preparative Example 301

Unoxol Diol (5.5 grams) was placed into a plastic beaker and degassed in a vacuum oven (30 in Hg vacuum, 101 kPa vacuum), for 30 minutes, at 80° C. The diol was then cooled to ambient temperature. Desmodur N 3300A (14.72 grams) was added and the reactants were then stirred by hand for approximately one minute. Dabco T-12 (0.030 grams) was added to the contents of the beaker, mixed by hand for 15 seconds, and then immediately coated between two silicone coated paper liners (from CPFilms Inc., Martinsville, Va.) using a conventional lab-scale knife coating apparatus, which was nominally gauged to provide for a film thickness of 0.3 mm.

The resultant transparent film was sandwiched between the liners. This construction was then placed in an 80° C. oven for 24 hours, removed, and placed at ambient temperature for an additional 2 weeks.

Thermoforming trials were performed on a Rotary Vacuum Former, manufactured by Custom Manufacturing Incorporated (CMI, Gladwin, Mich.). A 6-inch (15-cm) square film was cut from the sample prepared by the procedure above, placed onto a vacuum mold, and secured with masking tape. The top pre-heat temperature was set at 600° F. (316° C.). The stage of the vacuum former was raised, heated from the pre-heater above the mold for approximately 3 minutes, a vacuum (1 mm Hg, 133 Pa) was applied for a minute, and the mold was removed from the vacuum former and allowed to cool to below the glass transition of the polyurethane before removing the sample. A well-defined shape was produced from this film sample.

Example 301

K-Flex 188 (8.50 g), PC-1667 (8.50 g), and Ferro Black (0.34 g) were combined in a plastic beaker and degassed in a vacuum oven (1 mm Hg, 133 Pa), for 30 minutes, at 80° C. The diols were cooled to 50° C. and Desmodur N 3300 A (9.94 g) was added and stirred by hand for approximately one minute. Dabco T-12 (0.040 g) was added and the combined ingredients were mixed for 15 seconds, and immediately coated between a silicone coated PET liner and Makrofol (10 mil DE1-1 modified polycarbonate from Sheffield Plastics, Sheffield, Mass.) using a lab-scale knife coating station, which was nominally set for a topcoat thickness of 5 mil (0.13 mm) The coated sheet was placed in an oven at 80° C. for 24 hours prior to testing. Thermoforming trials were performed using a rotary vacuum-former. The films were automatically advanced through the pre-heat stages, with a dwell in the last pre-heat station of 47 seconds at 600° F. (316° C.). Sufficient temperature was reached for the construction to begin to sag. The stage of the vacuum former was raised as the stage was moved into position, and heated from the pre-heater above the mold for approximately 30 seconds. Vacuum (1 mm Hg vacuum, 133 Pa) was applied as soon as the construction was in contact with the mold. The mold was then removed from the film. A defined shape was observed with no evidence of delamination or cracking.

Example 302

The procedure for Example 301 was repeated, except that the reactive composition was coated on a 30 mils (0.8 mm) thick sheet of a modified poly(methyl methacrylate) resin (available as Acrylite ZK-6 from Cyro Industries, Parsippany, N.J.). Good adhesion was observed with direct application of the formulation to the poly(methyl methacrylate), as well as comparable results for the thermoformed part—no indication of delamination or cracking.

Characterization of Solvent-Based Paint-Film Polyurethanes as Prepared in a Pan

The following experiments demonstrate the effect of including solvent on the density and glass transition of paint film polyurethane compositions produced by reacting a polyester polyol and a polyisocyanate. The solvents used in this study include toluene, ethyl acetate, MIBK (methyl isobutyl ketone), and THF (tetrahydrofuran). The solvents were dried over 4 angstrom molecular sieves for 24 hours and water determination was performed by Karl Fischer titration prior to use.

The general method for preparing each trial was conducted as follows. K-FLEX 188 (100% active polyester polyol, King Industries, Norwalk, Conn.) was added to a plastic beaker and degassed in a vacuum oven (30 in. Hg vacuum, 0.76 m Hg vacuum) for 30 minutes at 80° C. The polyol was then cooled to ambient temperature. For the examples, which contained solvent, the polyol and solvent were blended with a stir stick until a homogeneous mixture was formed. The catalyst DABCO T12 (dibutyltin dilaurate, Air Products, Allentown, Pa.) was added to the cup, followed by mixing by hand. DESMODUR N3300 (HDI (1,6-hexamethylene diisocyanate) trimer from Bayer Corporation, Pittsburgh, Pa.) was added at the desired level, mixed for 15 seconds by hand, and then mixed using the SPEED MIXER DAC 150 FVZ, (Flack-Tek Inc., Landrum, S.C.) for 15 seconds, at 3600 rpm. Note that DESMODUR W (dicyclohexylmethane-4,4'-diisocyanate from Bayer Corporation, Pittsburgh, Pa.) was used for selected samples in this study.

When mixing was completed, 12.0 g of each sample was poured into aluminum weighing dishes. The individual samples were placed in a fume hood with an inverted plastic beaker over the aluminum pan. The samples were left undisturbed for 48-60 hrs before analysis, or further conditioned at 70° C., or at 120° C. The data for density, glass transition temperature ($T_g$), and percent weight loss is recorded in Tables S2-S4.

TABLE S1

| SAMPLE | SOLVENT | SOLVENT, parts | K-FLEX 188, parts | DESMODUR N3300, parts | DESMODUR W, parts | DABCO T12, parts |
|---|---|---|---|---|---|---|
| S1A | control | 0 | 12.80 | 11.61 | 0 | 0.04 |
| S1B | control | 0 | 13.16 | 11.24 | 0 | 0.04 |
| S1C | 5% toluene | 1.25 | 12.60 | 11.24 | 0 | 0.04 |
| S1D | 10% toluene | 2.56 | 12.0 | 10.91 | 0 | 0.03 |
| S1E | 10% toluene | 2.56 | 12.51 | 10.38 | 0 | 0.03 |
| S1F | 30% toluene | 7.36 | 9.23 | 8.29 | 0 | 0.03 |
| S1G | 50% toluene | 12.41 | 6.47 | 5.93 | 0 | 0.03 |
| S1H | 5% ethyl acetate | 1.30 | 12.55 | 11.45 | 0 | 0.04 |
| S1I | 10% ethyl acetate | 2.56 | 12.07 | 11.01 | 0 | 0.03 |
| S1J | 10% ethyl acetate | 2.55 | 12.55 | 10.43 | 0 | 0.03 |
| S1K | 30% ethyl acetate | 7.43 | 9.07 | 8.25 | 0 | 0.03 |
| S1L | 50% ethyl acetate | 12.48 | 6.53 | 6.00 | 0 | 0.02 |
| S1M | 5% MIBK | 1.28 | 12.55 | 11.44 | 0 | 0.04 |
| S1N | 10% MIBK | 2.60 | 12.03 | 10.92 | 0 | 0.03 |
| S1O | 10% MIBK | 2.55 | 12.50 | 10.45 | 0 | 0.03 |
| S1P | 30% MIBK | 7.40 | 9.02 | 8.24 | 0 | 0.03 |
| S1Q | 50% MIBK | 12.42 | 6.50 | 5.93 | 0 | 0.02 |
| S1R | 5% THF | 1.27 | 12.50 | 11.52 | 0 | 0.04 |
| S1S | 10% THF | 2.55 | 12.01 | 10.91 | 0 | 0.03 |
| S1T | 10% THF | 2.56 | 12.55 | 11.61 | 0 | 0.03 |
| S1U | 30% THF | 7.39 | 9.00 | 8.21 | 0 | 0.03 |
| S1V | 50% THF | 12.49 | 6.54 | 5.92 | 0 | 0.02 |
| S1W | control | 0 | 15.57 | 0 | 9.61 | 0.04 |
| S1X | control | 0 | 16.05 | 0 | 9.04 | 0.04 |
| S1Y | 10% ethyl acetate | 2.53 | 14.08 | 0 | 8.72 | 0.03 |
| S1Z | 10% ethyl acetate | 2.52 | 14.57 | 0 | 8.22 | 0.03 |

$T_g$ measurements reported in Table S2 were determined by differential scanning calorimetry (DSC) using a TA Instruments differential scanning calorimeter Model Q100 using crimped aluminum sample pans. The following protocol was used for first and second cycle: First Cycle: ramp from room temp to −60° C. at 20° C./min; ramp from −60° C. to 80° C. at 20° C./min; and Second Cycle: ramp from 80° C. to −60° C. at 50° C./min; ramp from −60° C. to 80° C. at 20° C./min. The densities were determined using the Archimedes method. In Tables S2 and S3, * indicates a poor baseline from which to calculate data. In Table S4, ** indicates no data due to excessive foaming of sample.

TABLE S2

| SAMPLE | SOLVENT | DENSITY, grams/mL | $T_g$ by DSC, ° C. | Percent (%) weight loss, 60 hrs at Room Temperature (RT) |
|---|---|---|---|---|
| S1A | control | 1.180 | 31.43 | 0.05 |
| S1B | control | 1.175 | 32.75 | 0.03 |
| S1C | 5% toluene | 1.160 | 14.07 | 0.01 |
| S1D | 10% toluene | 1.146 | −1.47 | −0.08 |
| S1E | 10% toluene | 1.141 | −2.50 | −0.02 |
| S1F | 30% toluene | 1.108 | −18.87 | −4.19 |
| S1G | 50% toluene | 1.105 | −22.04 | −16.60 |
| S1H | 5% ethyl acetate | 1.160 | 1.2 | −0.01 |
| S1I | 10% ethyl acetate | 1.148 | −12.67 | −0.16 |
| S1J | 10% ethyl acetate | 1.150 | −11.98 | −0.08 |
| S1K | 30% ethyl acetate | 1.122 | −8.43 | −6.29 |
| S1L | 50% ethyl acetate | 1.126 | −20.06 | −17.11 |
| S1M | 5% MIBK | 1.154 | 8.08 | −0.01 |
| S1N | 10% MIBK | 1.133 | −8.95 | −0.07 |
| S1O | 10% MIBK | 1.132 | −8.88 | −0.03 |
| S1P | 30% MIBK | 1.076 | −15.72 | −3.81 |
| S1Q | 50% MIBK | 1.064 | −18.72 | −15.87 |
| S1R | 5% THF | 1.158 | 6.96 | −0.03 |
| S1S | 10% THF | 1.143 | −5.07 | −0.04 |
| S1T | 10% THF | 1.147 | −2.39 | −0.07 |
| S1U | 30% THF | 1.112 | −22.79 | −4.96 |
| S1V | 50% THF | 1.112 | −26.78 | −16.73 |
| S1W | control | 1.138 | * | 0.02 |
| S1X | control | 1.141 | * | 0.03 |
| S1Y | 10% ethyl acetate | 0.876 | 9.85 | −0.27 |
| S1Z | 10% ethyl acetate | 0.937 | 7.12 | −0.05 |

TABLE S3

| SAMPLE | SOLVENT | DENSITY, grams/mL | $T_g$ by DSC, °C | PERCENT WEIGHT LOSS, 36 hrs at RT, 24 hrs at 70° C. |
|---|---|---|---|---|
| S1A | control | 1.179 | 28.07 | −0.01 |
| S1B | control | 1.178 | * | 0.01 |
| S1C | 5% toluene | 1.163 | 10.89 | −0.26 |
| S1D | 10% toluene | 1.148 | −2.41 | −0.91 |
| S1E | 10% toluene | 1.146 | −2.15 | −0.57 |
| S1F | 30% toluene | 1.127 | −5.86 | −8.38 |
| S1G | 50% toluene | 1.122 | −5.22 | −20.47 |
| S1H | 5% ethyl acetate | 1.168 | 3.80 | −0.17 |
| S1I | 10% ethyl acetate | 1.158 | −2.00 | −1.10 |
| S1J | 10% ethyl acetate | 1.154 | −6.97 | −1.00 |
| S1K | 30% ethyl acetate | 1.146 | −9.04 | −9.80 |
| S1L | 50% ethyl acetate | 1.153 | −14.94 | −20.48 |
| S1M | 5% MIBK | 1.154 | 9.46 | −0.04 |
| S1N | 10% MIBK | 1.133 | −4.71 | −0.74 |
| S1O | 10% MIBK | 1.134 | −8.36 | −0.61 |
| S1P | 30% MIBK | 1.107 | −22.68 | −7.99 |
| S1Q | 50% MIBK | 1.108 | −14.98 | −21.10 |
| S1R | 5% THF | 1.160 | 9.30 | −0.16 |
| S1S | 10% THF | 1.152 | −5.22 | −0.70 |
| S1T | 10% THF | 1.149 | −4.32 | −0.59 |
| S1U | 30% THF | 1.135 | −8.31 | −8.52 |
| S1V | 50% THF | 1.137 | −18.42 | −19.74 |
| S1W | control | 1.084 | * | −0.06 |
| S1X | control | 1.131 | * | −0.2 |
| S1Y | 10% ethyl acetate | 0.497 | 38.60 | −0.91 |
| S1Z | 10% ethyl acetate | 0.837 | 10.99 | −0.48 |

TABLE S4

| SAMPLE | SOLVENT | DENSITY, grams/mL | $T_g$ by DSC, °C | PERCENT WEIGHT LOSS, 60 hrs at RT, 24 hrs at 120° C. |
|---|---|---|---|---|
| S1A | control | 1.176 | 38.23 | −0.05 |
| S1B | control | 1.177 | * | −0.02 |
| S1C | 5% toluene | 1.172 | 34.89 | −1.20 |
| S1D | 10% toluene | 1.165 | 23.26 | −2.86 |
| S1E | 10% toluene | 1.152 | 2.27 | −1.39 |
| S1F | 30% toluene | 1.148 | 15.28 | −12.91 |
| S1G | 50% toluene | 1.163 | 32.34 | −23.65 |
| S1H | 5% ethyl acetate | 1.167 | 16.14 | −0.76 |
| S1I | 10% ethyl acetate | 1.166 | 22.74 | −3.39 |
| S1J | 10% ethyl acetate | 1.152 | 16.50 | −3.08 |
| S1K | 30% ethyl acetate | 1.152 | 33.10 | −13.24 |
| S1L | 50% ethyl acetate | 1.170 | 23.99 | −22.87 |
| S1M | 5% MIBK | 1.162 | 18.51 | −0.96 |
| S1N | 10% MIBK | 1.153 | 4.18 | −2.25 |
| S1O | 10% MIBK | 1.143 | 10.58 | −2.29 |
| S1P | 30% MIBK | 1.153 | 22.59 | −13.82 |
| S1Q | 50% MIBK | 1.160 | 23.05 | −23.55 |
| S1R | 5% THF | 1.173 | 22.44 | −0.90 |
| S1S | 10% THF | 1.165 | 11.86 | −2.38 |
| S1T | 10% THF | 1.153 | 6.98 | −2.49 |
| S1U | 30% THF | 1.153 | 7.94 | −12.39 |
| S1V | 50% THF | 1.164 | 16.17 | −22.54 |
| S1W | control | 0.985 | * | −0.06 |
| S1X | control | 0.996 | * | −0.04 |
| S1Y | 10% ethyl acetate | ** | ** | ** |
| S1Z | 10% ethyl acetate | ** | ** | ** |

Characterization of Solvent-Based Polyurethane Paint-Films when Cast on One Liner or Between Two Liners This experiment demonstrates the influence of incorporating solvent on the surface topology of polyurethane paint films, when cast on one liner, or between two liners. The films were prepared according to the compositions reported in Table T1. K-FLEX 188, (100% active polyester polyol) was added to a plastic beaker and degassed in a vacuum oven (30 in. Hg vacuum, 0.76 m Hg vacuum) for 30 minutes at 80° C. The polyol was cooled to ambient temperature and solvent, if used, was added and blended with a stir stick until a homogeneous mixture was formed. The catalyst DABCO T12 (dibutyltin dilaurate) was added to the cup, followed by mixing by hand. DESMODUR N3300 (HDI trimer) was added at the desired level, mixed for 15 seconds by hand, and then mixed using the SPEED MIXER DAC 150 FVZ mixer for 15 seconds, at 3600 rpm. The reactive composition was then immediately coated between a top and bottom silicone poly-liner (2.5 mil (0.064 mm) polyester release liner supplied by CPFilms Inc., Martinsville, Va.) using a lab-scale knife coat station, which was nominally gauged for a film thickness of 0.3 mm; or coated on a silicone poly-liner with a no. 32 Meyer rod; or on PET.

TABLE T1

| SAMPLE | K-FLEX 188, parts | Solvent 1 toluene, parts | Solvent 2 ethyl acetate, parts | Solvent 3 water, parts | DABCO T12, parts | DESMODUR N3300, parts |
|---|---|---|---|---|---|---|
| T1A | 12.0 | 0 | 0 | 0 | 0.01 | 12.0 |
| T1B | 12.0 | 0 | 0 | 0.02 | 0.01 | 12.0 |
| T1C | 12.0 | 2.4 | 0 | 0 | 0.01 | 12.0 |
| T1D | 12.0 | 0 | 2.4 | 0 | 0.01 | 12.0 |

The samples were dried at ambient temperature for 24 hours. Surface roughness was measured using a MITUTOYO SURFTEST SJ-401 stylus type profilometer (Mississauga, ON). Results are reported in Table T2.

TABLE T2

| SAMPLE | SOLVENT | LINER TYPE | NUMBER OF LINERS | MEASURED SIDE | $R_a$, micrometers (average surface) | $R_z$, micrometers (average deepest) | OBSERVATIONS |
|---|---|---|---|---|---|---|---|
| T1A | none | silicone polyliner | 1 | air | 0.06 | 0.3 | smooth |
| T1A | none | silicone polyliner | 1 | liner | 0.10 | 0.5 | smooth |
| T1A | none | silicone polyliner | 2 | liner | 0.04 | 0.4 | smooth |
| T1B | water | silicone polyliner | 2 | liner | 0.04 | 0.4 | some bubbles |
| T1C | toluene | silicone polyliner | 1 | air | 0.25 | 2.0 | rough to touch |
| T1C | toluene | silicone polyliner | 1 | liner | 0.08 | 1.0 | smooth |
| T1C | toluene | silicone polyliner | 2 | liner | 0.35 | 3.3 | bubbles trapped between liners |
| T1D | ethyl acetate | pet | 1 | air | 1.04 | 5.1 | rough to touch |
| T1D | ethyl acetate | silicone polyliner | 2 | liner | 0.12 | 0.6 | bubbles trapped between liners |

Characterization of Solvent-Based Polyurethane Film Coated Between Two Liners

These experiments demonstrate the influence of incorporated solvent on both color and bubble defects for solvent-based, urethane paint film compositions. Toluene, the solvent used for these experiments, was first dried over molecular sieves to less than 10 ppm of water and was added to the formulations at levels ranging from 0.10%-50%, by weight of total formulation.

The general method of sample preparation Table U1 (A-L) was conducted as follows. K-Flex 188 (100% active polyester polyol) was added to a plastic beaker and degassed in a vacuum oven (30 in. Hg vacuum, 0.76 m Hg vacuum) for 30 minutes at 80° C. The polyol was then cooled to ambient temperature. For the examples, which contained solvent, the polyol and solvent were blended together with a stir stick until a homogeneous mixture was formed. The catalyst DABCO T12 (dibutyltin dilaurate) was added to the cup, followed by mixing by hand. DESMODUR N3300 (HDI trimer) was added at the desired level, mixed for 15 seconds by hand, and then mixed using the SPEED MIXER DAC 150 FVZ (Flack-Tek, Inc., Landrum, S.C.), for 15 seconds, at 3600 rpm. The mil 3M ACRYLIC PLUS TAPE PT 1100 (double-coated acrylic foam tape) to provide caliper control. The reactive reaction mixture was immediately coated between two silicone coated PET liners (2.5 mil (0.64 mm) polyester release liner supplied by CPFilms Inc.), which were prepared as follows. The bottom PET liner was lined with two strips of 6 composition was poured onto the bottom liner and the top liner was applied with a metal bar so as to provide for a rolling bank of material. The films prepared in this manner were dried at ambient temperature for 24 hours and then further cured at 80° C. for 24 hours. The film color rating is reported in Table U1 using the following rating scale: 0=clear, 1=very slight yellow, 2=noticeable yellow, 3=very yellow.

TABLE U1

| SAMPLE | K-FLEX 188, parts | TOLUENE, parts | DABCO T12, parts | DESMODUR N3300, parts | FILM COLOR RATING after 80° C. for 24 hr |
|---|---|---|---|---|---|
| U1A | 15.59 | 0 | 0.04 | 14.29 | 0 |
| U1B | 15.50 | 0 | 0.04 | 12.92 | 0 |
| U1C | 15.58 | 0 | 0.05 | 15.65 | 2 |
| U1D | 15.60 | 0.04 | 0.04 | 14.26 | 0 |
| U1E | 15.55 | 0.08 | 0.04 | 14.16 | 1 |
| U1F | 15.58 | 0.16 | 0.04 | 14.26 | 2 |
| U1G | 15.56 | 0.22 | 0.04 | 14.22 | 1 |
| U1H | 15.56 | 0.30 | 0.04 | 14.23 | 2 |

TABLE U1-continued

| SAMPLE | K-FLEX 188, parts | TOLUENE, parts | DABCO T12, parts | DESMODUR N3300, parts | FILM COLOR RATING after 80° C. for 24 hr |
|---|---|---|---|---|---|
| U1I | 15.52 | 0.60 | 0.04 | 14.16 | 2 |
| U1J | 15.57 | 1.56 | 0.04 | 14.24 | 3 |
| U1K | 15.50 | 1.50 | 0.04 | 13.00 | 0 |
| U1L | 15.54 | 1.63 | 0.04 | 15.51 | 3 |

The samples in Table U2 (U2A-U2J) were prepared as described above for samples U1A-U1L. The films were immediately cut into 3-equal pieces: one portion placed at ambient temperature, one portion placed into a 70° C. oven for 15 minutes, and one portion placed into a 120° C. oven for 15 minutes. Data for film formation and for the films conditioned at each temperature for 15 minutes is recorded in the following table. The effect of increased temperature caused pronounced defects with respect to bubble formation for all samples with the exception of sample U2A.

TABLE U2

| SAMPLE | K-FLEX 188, parts | TOLUENE, parts | DABCO T12, parts | DESMODUR N3300, parts | FILM AGING AFTER 15 MINUTES RT | FILM AGING AFTER 15 MINUTES AT 70° C. | FILM AGING AFTER 15 MINUTES AT 120° C. |
|---|---|---|---|---|---|---|---|
| U2A | 15.53 | 0 | 0.04 | 14.63 | clear | clear | clear |
| U2B | 15.54 | 0.16 | 0.04 | 14.14 | clear | very, very few tiny bubbles | large bubbles on tape; many tiny bubbles |
| U2C | 15.52 | 0.30 | 0.04 | 14.20 | moderate number of tiny bubbles | many tiny bubbles | large bubbles on tape; moderate tiny bubbles |
| U2D | 15.51 | 0.61 | 0.04 | 14.20 | moderate number of tiny bubbles | many tiny bubbles | large bubbles on tape; few tiny bubbles |
| U2E | 15.02 | 0.90 | 0.04 | 13.64 | moderate number of tiny bubbles | some spots on tape; many tiny bubbles | large bubbles on tape and slightly foamy; many tiny bubbles |
| U2F | 15.05 | 1.52 | 0.04 | 13.61 | moderate number of tiny bubbles | some spots on tape; many tiny bubbles | large bubbles on tape and slightly foamy; many, many tiny bubbles |
| U2G | 14.52 | 2.26 | 0.04 | 13.28 | moderate number of tiny bubbles | some spots on tape; many tiny bubbles | large bubbles on tape and slightly foamy; many, many tiny bubbles |
| U2H | 14.41 | 2.98 | 0.04 | 12.70 | moderate number of tiny bubbles | some spots on tape; many tiny bubbles | large bubbles on tape and slightly foamy; many, many tiny bubbles |
| U2I | 11.06 | 9.10 | 0.03 | 10.07 | some tiny bubbles | some spots on tape; many tiny bubbles | spots on tape wrinkled and cracked |

TABLE U2-continued

| SAMPLE | K-FLEX 188, parts | TOLUENE, parts | DABCO T12, parts | DESMODUR N3300, parts | FILM AGING AFTER 15 MINUTES RT | FILM AGING AFTER 15 MINUTES AT 70° C. | FILM AGING AFTER 15 MINUTES AT 120° C. |
|---|---|---|---|---|---|---|---|
| U2J | 7.86 | 14.92 | 0.02 | 7.23 | huge bubbles in film | few large bubbles; some tiny bubbles | spots on tape wrinkled and cracked |

Shape Memory Testing

Specimens of the material prepared in Preparative Example 106 were evaluated by Dynamic Mechanical Analysis using a TA Instruments model DMA Q800 dynamic mechanical testing apparatus. The material exhibited a tan delta peak temperature ($T_g$) of 38° C., had a tensile storage modulus (F) of 1900 megapascals (MPa) at $T_g$−40° C. (−2° C.), and had a tensile storage modulus (F) of 6 MPa at $T_g$+40° C. (78° C.). A specimen of the material (having the dimensions of length=7.2 mm, width 6.1 mm, and height=0.45 mm) was subjected to three strain-recovery cycles to measure the shape memory of the material. The specimen was heated to 40° C., then a tensile force increasing at 2 newtons (N) per minute to a maximum of 8 N was applied (maximum strain=63%). The maximum tensile force was maintained while the sample was cooled to −20° C., where it became glassy. The tensile force was then relaxed at −20° C. The specimen was then reheated to 40° C. (with negligible tensile force) and the strain returned to 3%. The shape memory of the specimen became evident at about 25° C. The cycle was then repeated twice more, each time returning to 3% strain as compared to the original specimen.

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a multilayer article, the method comprising:

providing a first forming web and a base layer releasably adhered to the first forming web, the base layer comprising a first polymeric material, and the base layer having a first major surface and a second major surface opposite its first major surface;

contacting a curable composition with the base layer and a second forming web to form a rolling bank of the curable composition disposed between the base layer and the second forming web, the curable composition comprising a curable polymeric material precursor;

passing at least a portion of each of the first forming web, the base layer, the second forming web, and the curable composition through a nip to provide a curable layer precursor while said at least a portion of the curable composition is sandwiched between the base layer and the second forming web;

at least partially curing the curable layer precursor to provide a transparent protective layer comprising a second polymeric material, at least one of the first polymeric material and the second polymeric material comprising a polyurethane, the polyurethane having hard segments in an amount of from 35 to 65 percent by weight;

separating the first forming web from the base layer;

disposing a first adhesive layer on the first major surface of base layer;

providing a thermoformable substrate having a first major surface and a second major surface opposite its first major surface; and permanently adhering the first adhesive layer to the second major surface of the thermoformable substrate.

2. The method of claim 1, wherein the first polymeric material comprises the polyurethane.

3. The method of claim 1, wherein the second polymeric material comprises the polyurethane.

* * * * *

UNITED STATES PATENT AND TRADEMARK OFFICE
CERTIFICATE OF CORRECTION

PATENT NO. : 8,551,279 B2  
APPLICATION NO. : 12/934088  
DATED : October 8, 2013  
INVENTOR(S) : Michael A. Johnson et al.

Page 1 of 1

It is certified that error appears in the above-identified patent and that said Letters Patent is hereby corrected as shown below:

In the Specification

Column 34  
Line 41, Delete "(1.5 m/min)" and insert -- (1.5 m/min). --, therefor.

Column 34  
Line 48, Delete "(0.1 mm)" and insert -- (0.1 mm). --, therefor.

Column 34  
Line 53, Delete "Erichsenk" and insert -- Erichsen --, therefor.

Column 36  
Line 3, Delete "(0.79 mm)" and insert -- (0.79 mm). --, therefor.

Column 45  
Line 65-66, Delete "(0.13 mm)" and insert -- (0.13 mm). --, therefor.

Column 55  
Line 20, Delete "(F)" and insert -- (E') --, therefor.

Column 55  
Line 21, Delete "(F)" and insert -- (E') --, therefor.

Signed and Sealed this  
Sixth Day of May, 2014

Michelle K. Lee  
*Deputy Director of the United States Patent and Trademark Office*